United States Patent
Gorin et al.

(10) Patent No.: US 11,997,172 B2
(45) Date of Patent: *May 28, 2024

(54) BROWSER NAVIGATION FOR FACILITATING DATA ACCESS

(71) Applicant: Bevara Technologies, LLC, Watertown, MA (US)

(72) Inventors: Jerome Gorin, Paris (FR); Maja Bystrom, Watertown, MA (US)

(73) Assignee: Bevara Technologies, LLC, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,192

(22) Filed: Nov. 7, 2022

(65) Prior Publication Data

US 2023/0138362 A1    May 4, 2023

Related U.S. Application Data

(60) Continuation of application No. 17/179,891, filed on Feb. 19, 2021, now Pat. No. 11,496,585, which is a
(Continued)

(51) Int. Cl.
*G06F 15/16*  (2006.01)
*G06F 16/383* (2019.01)
(Continued)

(52) U.S. Cl.
CPC .......... *H04L 67/34* (2013.01); *G06F 16/383* (2019.01); *G06F 16/955* (2019.01);
(Continued)

(58) Field of Classification Search
CPC ....... H04L 67/34; H04L 67/02; H04L 67/303; G06F 16/955; G06F 16/383; G06F 40/123; G06F 40/146
(Continued)

(56) References Cited

U.S. PATENT DOCUMENTS

| 5,987,181 A | 11/1999 | Makiyama et al. |
| 6,026,404 A * | 2/2000 | Adunuthula .......... H04L 69/329 719/330 |

(Continued)

FOREIGN PATENT DOCUMENTS

| EP | 1562193 A1 | 8/2005 |
| EP | 1818907 A1 | 8/2007 |

(Continued)

OTHER PUBLICATIONS

Angus, Andreww, "Dropbox: Video Sharing and Photo Sharing Made Easy" [blog post] http://www.switchvideo.com/blog/2011/05/09/dropbox-video-sharing-and-photo-sharing-madeeasy/ May 9, 2011 Switch Video. Retrieved on Mar. 14, 2013.

(Continued)

*Primary Examiner* — Anthony Mejia
(74) *Attorney, Agent, or Firm* — Veros Legal Solutions LLP

(57) ABSTRACT

An apparatus for decoding and rendering or otherwise processing, manipulating, or outputting a variety of digital data is provided. The apparatus may include a browser engine configured to receive first encoded digital data. The apparatus may include a browser extension configured to intercept the first encoded digital data transmitted in response to a first request from the browser engine. The browser extension may be configured to intercept a first decoder written in a platform-independent syntax for decoding at least a portion of the first encoded digital data. The browser extension may be configured to point the browser engine to one or more local storage locations of the first encoded digital data and the first decoder.

15 Claims, 13 Drawing Sheets

Related U.S. Application Data division of application No. 16/250,525, filed on Jan. 17, 2019, now Pat. No. 10,965,780.

(60) Provisional application No. 62/619,092, filed on Jan. 18, 2018.

(51) Int. Cl.

| | | |
|---|---|---|
| *G06F 16/955* | (2019.01) | |
| *G06F 16/957* | (2019.01) | |
| *G06F 40/123* | (2020.01) | |
| *G06F 40/146* | (2020.01) | |
| *H04L 67/00* | (2022.01) | |
| *H04L 67/02* | (2022.01) | |
| *H04L 67/303* | (2022.01) | |

(52) U.S. Cl.
CPC ........ *G06F 16/9574* (2019.01); *G06F 40/123* (2020.01); *G06F 40/146* (2020.01); *H04L 67/02* (2013.01); *H04L 67/303* (2013.01)

(58) Field of Classification Search
USPC .......................................................... 709/246
See application file for complete search history.

(56) References Cited

U.S. PATENT DOCUMENTS

| | | | |
|---|---|---|---|
| 6,181,711 B1 | 1/2001 | Zhang et al. | |
| 6,247,056 B1* | 6/2001 | Chou .................. | H04L 9/40 709/227 |
| 6,624,761 B2 | 9/2003 | Fallon | |
| 6,845,505 B1* | 1/2005 | Adunuthula .......... | H04L 61/00 718/104 |
| 6,904,176 B1* | 6/2005 | Chui .................... | H04N 19/40 375/E7.146 |
| 7,512,986 B2 | 3/2009 | Shen-Orr et al. | |
| 7,646,432 B2 | 1/2010 | Park et al. | |
| 7,647,619 B2 | 1/2010 | Kashima | |
| 8,527,881 B2 | 9/2013 | Selig | |
| 8,995,534 B2* | 3/2015 | Richardson .......... | H04N 19/162 386/328 |
| 8,996,661 B1* | 3/2015 | Kolam .................. | H04L 67/06 709/200 |
| 9,369,717 B2 | 6/2016 | Richardson et al. | |
| 9,578,078 B2 | 2/2017 | Bystrom et al. | |
| 9,645,700 B2* | 5/2017 | Tsai .................... | G06Q 30/0275 |
| 9,660,823 B2* | 5/2017 | Zhang ................ | H04L 12/1822 |
| 9,667,685 B2 | 5/2017 | Bystrom et al. | |
| 9,692,787 B1* | 6/2017 | Warner ................ | H04L 63/20 |
| 9,870,116 B1* | 1/2018 | Yasskin .............. | G06F 9/44526 |
| 10,025,787 B2 | 7/2018 | Bystrom et al. | |
| 10,129,556 B2 | 11/2018 | Gorin et al. | |
| 10,462,216 B1* | 10/2019 | Vysotsky .......... | H04L 67/1091 |
| 11,496,585 B2 | 11/2022 | Gorin et al. | |
| 2002/0010859 A1 | 1/2002 | Maeda | |
| 2002/0018580 A1 | 2/2002 | Maeda | |
| 2002/0035544 A1 | 3/2002 | Wakao et al. | |
| 2002/0087999 A1 | 7/2002 | Kashima | |
| 2003/0018694 A1 | 1/2003 | Chen et al. | |
| 2003/0145338 A1* | 7/2003 | Harrington ........ | H04N 21/8193 725/86 |
| 2003/0149793 A1* | 8/2003 | Bannoura ............ | H04L 69/04 709/247 |
| 2003/0158889 A1* | 8/2003 | Massarani ............ | H04L 67/564 709/203 |
| 2003/0163430 A1 | 8/2003 | Takaku | |
| 2003/0177400 A1* | 9/2003 | Raley ................ | H04N 21/4788 713/168 |
| 2003/0193940 A1 | 10/2003 | Kugumiya | |
| 2004/0028141 A1 | 2/2004 | Hsiun et al. | |
| 2004/0059776 A1* | 3/2004 | Pitzel .................... | G06F 16/284 707/999.01 |
| 2004/0067043 A1 | 4/2004 | Duruoz et al. | |
| 2004/0221143 A1 | 11/2004 | Wise et al. | |
| 2005/0149500 A1* | 7/2005 | Marmaros ........... | G06F 16/9538 |
| 2005/0177626 A1 | 8/2005 | Freiburg et al. | |
| 2005/0283717 A1* | 12/2005 | Giraldo .................. | G06Q 10/00 715/205 |
| 2006/0056506 A1 | 3/2006 | Ho et al. | |
| 2006/0087457 A1 | 4/2006 | Rachwalski et al. | |
| 2006/0116966 A1 | 6/2006 | Pedersen et al. | |
| 2006/0123455 A1 | 6/2006 | Pai et al. | |
| 2006/0227815 A1 | 10/2006 | Khan | |
| 2006/0248235 A1 | 11/2006 | Eyer | |
| 2006/0288404 A1* | 12/2006 | Kirshnan ................ | H04L 67/02 726/5 |
| 2007/0013562 A1 | 1/2007 | Fujinami et al. | |
| 2007/0070404 A1* | 3/2007 | Caradec ........... | H04N 21/43615 348/E5.002 |
| 2007/0200658 A1 | 8/2007 | Yang | |
| 2007/0204300 A1* | 8/2007 | Markley .......... | H04N 21/47202 348/E7.071 |
| 2007/0204314 A1* | 8/2007 | Hasek .............. | H04N 21/42676 725/100 |
| 2007/0274340 A1 | 11/2007 | Raveendran et al. | |
| 2007/0288750 A1* | 12/2007 | Camenisch .......... | G06Q 20/383 713/168 |
| 2007/0296613 A1 | 12/2007 | Hussain et al. | |
| 2008/0027953 A1 | 1/2008 | Morita et al. | |
| 2008/0049971 A1* | 2/2008 | Ramos .................. | G06F 40/143 382/100 |
| 2008/0052540 A1 | 2/2008 | Inokuchi et al. | |
| 2008/0066181 A1 | 3/2008 | Haveson et al. | |
| 2008/0181400 A1 | 7/2008 | Guleryuz et al. | |
| 2008/0209534 A1* | 8/2008 | Keronen .................. | G07F 7/02 726/9 |
| 2008/0243995 A1 | 10/2008 | Dong et al. | |
| 2008/0252490 A1 | 10/2008 | Chiluk et al. | |
| 2008/0294691 A1 | 11/2008 | Chang et al. | |
| 2008/0313340 A1* | 12/2008 | Liu ........................ | H04L 67/04 709/228 |
| 2009/0016446 A1 | 1/2009 | Yang et al. | |
| 2009/0024925 A1* | 1/2009 | Stevens ................ | G11B 27/034 715/716 |
| 2009/0047000 A1* | 2/2009 | Walikis ................ | G06F 16/4387 386/292 |
| 2009/0086104 A1 | 4/2009 | Felder | |
| 2009/0110067 A1 | 4/2009 | Sekiguchi et al. | |
| 2009/0142038 A1 | 6/2009 | Nishikawa | |
| 2009/0154556 A1 | 6/2009 | Kim et al. | |
| 2009/0304115 A1 | 12/2009 | Pittaway et al. | |
| 2009/0310671 A1 | 12/2009 | Reynolds et al. | |
| 2009/0313300 A1 | 12/2009 | Dettori et al. | |
| 2010/0027974 A1 | 2/2010 | Ansari | |
| 2010/0046627 A1 | 2/2010 | Xiao et al. | |
| 2010/0195820 A1 | 8/2010 | Frank | |
| 2010/0205228 A1* | 8/2010 | Reese .................... | G06Q 30/02 707/805 |
| 2011/0016381 A1* | 1/2011 | Cahill ................ | G06F 11/3017 718/100 |
| 2011/0061086 A1 | 3/2011 | Huang | |
| 2011/0131520 A1* | 6/2011 | Al-Shaykh ........ | H04M 1/72412 715/771 |
| 2011/0185273 A1* | 7/2011 | DaCosta .................. | G06Q 99/00 715/234 |
| 2011/0231481 A1* | 9/2011 | Calahan ............ | G06F 16/9574 709/203 |
| 2011/0276716 A1* | 11/2011 | Coulson ............ | H04L 61/4511 709/238 |
| 2011/0306304 A1* | 12/2011 | Forutanpour ...... | H04M 1/72457 455/67.11 |
| 2012/0069910 A1 | 3/2012 | Richardson et al. | |
| 2012/0069911 A1 | 3/2012 | Richardson et al. | |
| 2012/0072225 A1 | 3/2012 | Richardson et al. | |
| 2012/0250757 A1 | 10/2012 | Mabey et al. | |
| 2012/0317295 A1* | 12/2012 | Baird .................... | H04L 67/131 709/228 |
| 2012/0323758 A1 | 12/2012 | Henning | |
| 2013/0103786 A1 | 4/2013 | Miglore | |
| 2013/0188739 A1 | 7/2013 | Bystrom et al. | |

(56) References Cited

U.S. PATENT DOCUMENTS

| | | | |
|---|---|---|---|
| 2013/0195171 A1 | 8/2013 | Wang et al. | |
| 2014/0126883 A1 | 5/2014 | Yogeshwar et al. | |
| 2014/0149586 A1* | 5/2014 | Clapp | H04L 67/02 709/224 |
| 2014/0317668 A1 | 10/2014 | Zhang et al. | |
| 2014/0380113 A1 | 12/2014 | Luby et al. | |
| 2015/0006798 A1* | 1/2015 | Ural | G06Q 40/04 711/103 |
| 2015/0066642 A1* | 3/2015 | Gupta | G06Q 30/0255 705/14.53 |
| 2015/0128155 A1* | 5/2015 | Ji | H04N 19/42 719/327 |
| 2015/0195325 A1 | 7/2015 | Bystrom et al. | |
| 2015/0331870 A1* | 11/2015 | Bystrom | G06F 16/74 707/661 |
| 2015/0334413 A1* | 11/2015 | Gorin | H04N 19/85 375/240.26 |
| 2016/0277472 A1 | 9/2016 | Bystrom et al. | |
| 2017/0034127 A1* | 2/2017 | Singleton, IV | H04L 63/0236 |
| 2017/0163605 A1* | 6/2017 | Martin-Bale | G06F 21/50 |
| 2017/0169123 A1* | 6/2017 | Reshadi | H04L 9/3236 |
| 2018/0027264 A1* | 1/2018 | Cheung | H04N 21/8173 725/115 |
| 2018/0343174 A1* | 11/2018 | Battre | H04L 67/02 |
| 2020/0137436 A1* | 4/2020 | Dhanabalan | H04L 67/06 |

FOREIGN PATENT DOCUMENTS

| | | |
|---|---|---|
| EP | 1912129 A3 | 9/2010 |
| WO | 2005046058 A1 | 5/2005 |
| WO | 2008127080 A1 | 10/2008 |

OTHER PUBLICATIONS

Avaro et al., "The MPEG-4 Systems and Description Language: A Way Ahead in Audio Visual Information Representation", Signal Processing: Image Communication (1997) 9(4): 385-431.

Bystrom et al., "A Fully Re-Configurable Universal Video Decoder", Conference on Design and Architectures for Signal & Image Processing (DASIP) 2009, 7 pages.

Chen et al., "Active Techniques for Real-Time Video Transmission and Playback", 2000 International Conference on Communications, New Orleans, LA Jun. 18-21, 2000, IEEE New York, NY; pp. 239-243.

Conor Hayes et al: "Smart Radio—Building Music Radio on the Fly" In: "Applications and Innovations in Intelligent Systems VIII", Jan. 1, 2001 (Jan. 1, 2001), Springer London, London, XP055576135, ISBN: 978-1-4471-0275-5, pp. 129-138, DOI: 10.1007/978-1-4471-0275-5_10.

Ding et al., "Reconfigurable video coding framework and decoder reconfiguration instantiation of AVS", Signal Processing, Image Communication (2009) 24(4): 287-299.

European Office Action issue by the European Patent Office in International Patent Application No. 19 704 911.7-1222 dated Nov. 11, 2021.

European Telecommunications Standards Institute, Technical Specifications: Hybrid Broadcast Broadband TV, ETSI TS 102 796 (2012); 88 pages.

Gorin et al., "Just-in-Time Adaptive Decoder Engine: A Universal Video Decoder based on MPEG RVC", Proc 19th ACM Int'l Conference on Multimedia, New York; NY—USA (2011), 4 pages.

Gorin et al., "Optimized dynamic compilation of dataflow representations for multimedia applications", Annal Telecommun, Springer Verlag (2013) 68(3-4):133-151.

International Preliminary Report on Patentability dated Aug. 3, 2016 in International Patent Application No. PCT/US2015/030525.

International Preliminary Report on Patentability issued in International Patent Application No. PCT/US2011/052394 dated Feb. 19, 2013.

International Preliminary Report on Patentability issued in International Patent Application No. PCT/US2011/052396 dated Feb. 12, 2013.

International Preliminary Report on Patentability issued in International Patent Application No. PCT/US2011/052401 dated Jan. 17, 2012.

International Preliminary Report on Patentability dated Mar. 27, 2020 in international patent application No. PCT/US2019/013998.

International Search Report and Written Opinion issued in International Patent Application No. PCT/US2011/052396 dated Jan. 24, 2012.

International Search Report and Written Opinion issued in International Patent Application No. PCT/US2011/052401 dated Jan. 17, 2012.

International Search Report and Written Opinion issued in International Patent Application No. PCT/US2013/023019 dated Apr. 12, 2013.

International Search Report and Written Opinion issued in International Patent Application No. PCT/US2015/030525 dated Oct. 27, 2015.

International Search Report and Written Opinion dated Mar. 20, 2019 in PCT/US2019/013998.

International Search Report issued in International Patent Application No. PCT/US2011/052394 dated Feb. 7, 2012.

Invitation to pay additional fees dated May 6, 2016 in International Patent Application No. PCT/US2015/030525.

Invitation to pay additional fees dated Jul. 27, 2015 in International Patent Application No. PCT/US2015/030525.

ISO/IEC 14496-12 Information Technology—Coding of Audio-Visual Objects—Part 12 ISO base media file format; International Organization for Standardization—4th Edition (2012); 196 pages.

ISO/IEC 14496-14 Information technology—Coding of audio-visual objects—Part 14 MP4 file format; International Organization for Standardization—1st Edition (2003); 18 pages.

Jang et al., "Reshaping Digital Media Business Models by Reconfigurable Video Coding", 78. MPEG Meeting; Oct. 23-27, 2006; Hangzhou, CN; (Motion Picture Expert Group or ISA/IEC JTC1/SC29/WG11); No. M13907, 5 pages.

Kannangara et al., "A Syntax for Defining, Communicating, and Implementing Video Decoder Function and Structure" IEEE Transactions on Circuits & Systems for Video Tech. (2010) 20(9) :1176-1186.

Kawanaka et al: "Accessibility commons: A Metadata Infrastructure for Web Accessibility", Computers and Accessibility, Jan. 1, 2008, p. 153, XP055568322, 2 Penn Plaza, Suite 701 New York NY 10121-0701 USA. DOI 10.1145/1414471.1414500. ISBN: 978-1-59593-976-0. Chapter 4; p. 158.

OneCodec. "OneCodec: Future proof your media." (online) Sep. 23, 2011 1-10, 13-15 (Sep. 23, 2011) Available at http://vimeo.com/29476212. Retrieved on Mar. 14, 2013.

Partial International Search Report issued in International Patent Application No. PCT/US2015/030525 dated Jul. 27, 2015.

Philp et al., "Decoder Description Syntax for Fully Configurable Video Coding", ICIP, Nov. 2009.

Richardson et al., "A Framework for Fully Configurable Video Coding", PCS 2009, 4 pages.

Richardson et al., "Dynamic transform replacement in an H.264 CODEC", 15th IEEE International Conference on Image Processing (2008) pp. 2108-2111.

Richardson et al., "Fully Configurable Video Coding—Part 1: Overview of FCVC", ISO/IEC JTC1/SC20/WG11 document M16751, Jun. 2009, 6 pages.

Richardson et al., "Fully Configurable Video Coding Part 2", ISO/IEC JTC1/SC20/EG11 document M16752, Jun. 2009, (London, UK) 5 pages.

Richardson et al., "Implementing Fully Configurable Video Coding", 16th IEEE International Conference on Image Processing (ICIP) Nov. 2009, pp. 765-768.

Shinya Kawanaka et al: "Accessibility commons : a metadata infrastructure for web accessibility", Computers and Accessibility, Jan. 1, 2008 (Jan. 1, 2008), p. 153, XP055568322, 2 Penn Plaza, Suite 701 New York NY 10121-0701 USA. DOI: 10.1145/1414471. 1414500. ISBN: 978-1-59593-976-0.

(56) References Cited

OTHER PUBLICATIONS

Swaney, Daniel S. et al. "Dynamic Web File Format Transformations with Grace." ArXiv abs/cs/0512068 (2005): n. pag.

Zhao et al., "A Random Access Protocol for Configurable Video Coding", 90th MPEG Meeting; Oct. 26-30, 2009; Xian, CN; (Motion Picture Expert Group or ISO/IEC JTC1/SC29/WG11), No. M16927; 15 pages.

* cited by examiner

BROWSER NAVIGATION FOR FACILITATING DATA ACCESS

RELATED APPLICATIONS

This application is a continuation of U.S. application Ser. No. 17/179,891, which is a divisional of U.S. application Ser. No. 16/250,525, both entitled Browser Navigation for Facilitating Data Access. This application also claims priority to U.S. Provisional Application No. 62/619,092, filed on Jan. 18, 2018. The disclosures of all the related applications set forth in this section are hereby incorporated by reference in their entireties.

BACKGROUND

Digital multimedia and general digital data capabilities can be incorporated into a wide range of devices, including digital televisions or displays, digital direct broadcast systems, wireless communication devices such as radio telephone handsets, wireless broadcast systems, personal handheld or wearable devices, laptop or desktop computers, digital cameras, digital recording devices, video gaming devices, video game consoles, data servers, and the like. Digital devices implement image and video encoding and communication techniques or formats such as JPEG, GIF, RAW, TIFF, PBM, MPEG-2, MPEG-4, H.264/MPEG-4, Part 10, Advanced Video Coding (AVC), OBJ, 3DS, and DIMACS to store, transmit and receive digital images and video efficiently. Digital devices implement audio encoding techniques or formats such as, AAC, MP3, and WAV to store, transmit, and receive digital audio efficiently. Digital devices implement additional data and graphics encoding techniques or formats such as IGES, 3DT, PS, MNG, ODF, HDFS, NetCDF, DWG, DXF, and SVG. Digital devices implement document, spreadsheet, and presentation formats such as PowerPoint, PDF, Microsoft Word, Microsoft Excel, and the like. Digital devices may further implement proprietary data storage formats for storage of scientific or other data.

Digital data is commonly encoded in a selected format (e.g. the formats set forth above) prior to transmission or storage. The encoding typically comprises operations such as compression and/or organization into a selected format. Digital data may be embedded in or otherwise referenced by other digital data. For instance, an image, video, data, or animation encoded in one format may be part of an electronic news article, electronic slideshow, web page, or technical paper that is encoded in a different format. In any case, encoded digital data must be accessed by an electronic device to be manipulated, processed, displayed, output in a manner useful for human interaction, or otherwise used by the electronic device or an operator thereof for a desired function. Accessors resident on electronic devices such as mobile devices, DVD players, Blu-Ray players, TV sets, tablets, laptops, computers, or set top boxes comprise software code configured to "undo" the encoding process, typically using metadata provided by the encoding to extract, decompress, and/or reformat the encoded data so that it is in a format useable by the device and/or software on the device such as an OS, a browser, a word processor, any other application program, etc. For a PC, such accessors can include DivX, Flash, or Adobe Acrobat, for example. However, a particular electronic device may not have software that supports decoding one or more formats for digital data it receives. For example, the format used for a received dataset may be a legacy format no longer supported or may be a new format that the receiving device does not yet support. This presents challenges to the content generator or archivist who wishes to ensure that the digital data are always accessible.

Since different access techniques support different formats, the traditional solutions are to either: encode the digital data in many different formats to support many different decoders; or to select a single format in which to encode a particular type of data. As examples of the latter approach, all images may be converted to a JPEG-2000 format, or all text documents may be converted to rich text format or PDF format. In both cases, decoding and re-encoding of digital data can lead to loss in quality and content. Transcoding older formats into new formats may require licensing of the new formats.

Furthermore, the former case requires additional storage for the copies of the data in the various formats, while the latter case relies on a single accessor always being supported on all platforms. Using a web browser running on a mobile device as an example, in the case in which the web browser does not support a particular format, such as JPEG-2000, a data user might see a blank spot in the web page where the JPEG-2000 image was to be displayed. Current approaches may require a user to manually download plug-ins for a browser and/or additional packages for a software application in order to access data encoded in each type of unsupported data format.

It should be noted that this Background is not intended to be an aid in determining the scope of the claimed subject matter nor be viewed as limiting the claimed subject matter to implementations that solve any or all of the disadvantages or problems presented above. The discussion of any technology, documents, or references in this Background section should not be interpreted as an admission that the material described is prior art to any of the subject matter claimed herein.

SUMMARY

In one implementation, an apparatus for decoding data comprises a browser engine configured to issue requests for network resources hosted on servers using network resource identifiers and to receive network resources in response to the requests. The apparatus also comprises and a browser extension configured to intercept at least a first request issued from the browser engine for first encoded data associated with a first network resource identifier, receive the first encoded data from a first server, generate and issue a request for at least a first accessor associated with a second, different network resource identifier based at least in part on the intercepting and/or receiving, and receive the first accessor from a second server. The first accessor comprises platform-independent syntax implementing an algorithm configured to decode at least a portion of the first encoded data requested by the browser engine.

In another implementation, a system for decoding data comprises browser code configured for execution on general-purpose processing circuitry and memory circuitry storing a plurality of accessors, wherein at least some of the plurality of accessors comprise platform-independent syntax implementing an algorithm for decoding encoded data. In this implementation, the browser code is configured to access the memory circuitry automatically without user intervention and retrieve one or more of the plurality of accessors in response to retrieving encoded data.

In another implementation, a method of decoding digital data for manipulation by and/or output to a user of browser software is provided. The method comprises receiving a user request to obtain a first network resource comprising first encoded digital data, wherein the first network resource is associated with a first network resource identifier; using the first network resource identifier to generate and issue a request to obtain the first encoded data over a network; receiving the first encoded data over the network; without further user intervention, using a second different network resource identifier to generate and issue a request to obtain a first accessor over the network, wherein the first accessor comprises platform-independent syntax implementing an algorithm configured to decode at least a portion of the first encoded data; and receiving the first accessor over the network.

In another implementation, a method of decoding digital data for manipulation by and/or output to a user of browser software comprises receiving a user request to obtain a first network resource comprising first encoded digital data with a browser engine, wherein the first network resource is associated with a first network resource identifier. The method further comprises using the first network resource identifier to generate and issue a request to obtain the first encoded data over a network with the browser engine. The method further comprises intercepting the request for the first encoded data, determining an encoding method applied to the first encoded data, and using a second different network resource identifier to generate and issue a request to obtain a first accessor over the network with a browser extension, wherein the first accessor comprises platform-independent syntax implementing an algorithm configured to decode at least a portion of the first encoded data.

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

Various embodiments are discussed in detail in conjunction with the Figures described below, with an emphasis on highlighting the advantageous features. These embodiments are for illustrative purposes only and any scale that may be illustrated therein does not limit the scope of the technology disclosed. These drawings include the following figures, in which like numerals indicate like parts.

DETAILED DESCRIPTION

The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention.

Implementations of the technology described herein are directed generally to extracting media from containers and providing media decoding capabilities for media files downloaded to and/or stored on computing devices. To facilitate an understanding of the various embodiments described herein, certain terms are defined below.

Definitions

Accessor: Software that can make encoded digital data available for display, interaction, processing, output, or any other desired functional use on an electronic device receiving and/or storing the data. Generally, a particular implementation of an accessor is configured to decode data that is encoded according to a particular defined compression algorithm/organizational format, or a family of compression algorithms/organizational formats. An accessor may also be referred to as a "decoder" herein. In some cases, in addition to basic decoding functionality such as decompression, an accessor may also function to extract one or more encoded data files from a container for decoding. An accessor as set forth herein can also include, in addition to one or more extraction and/or decoding functions, data manipulation or processing functionality that can be applied to digital data decoded by the accessor.

Container: A data file assembled in accordance with a metafile format defining how one or more data files and metadata associated with the one or more data files are organized together as the container data file. Containers can be nested, wherein a first container is packaged as a data file in a second container.

Figure 10:
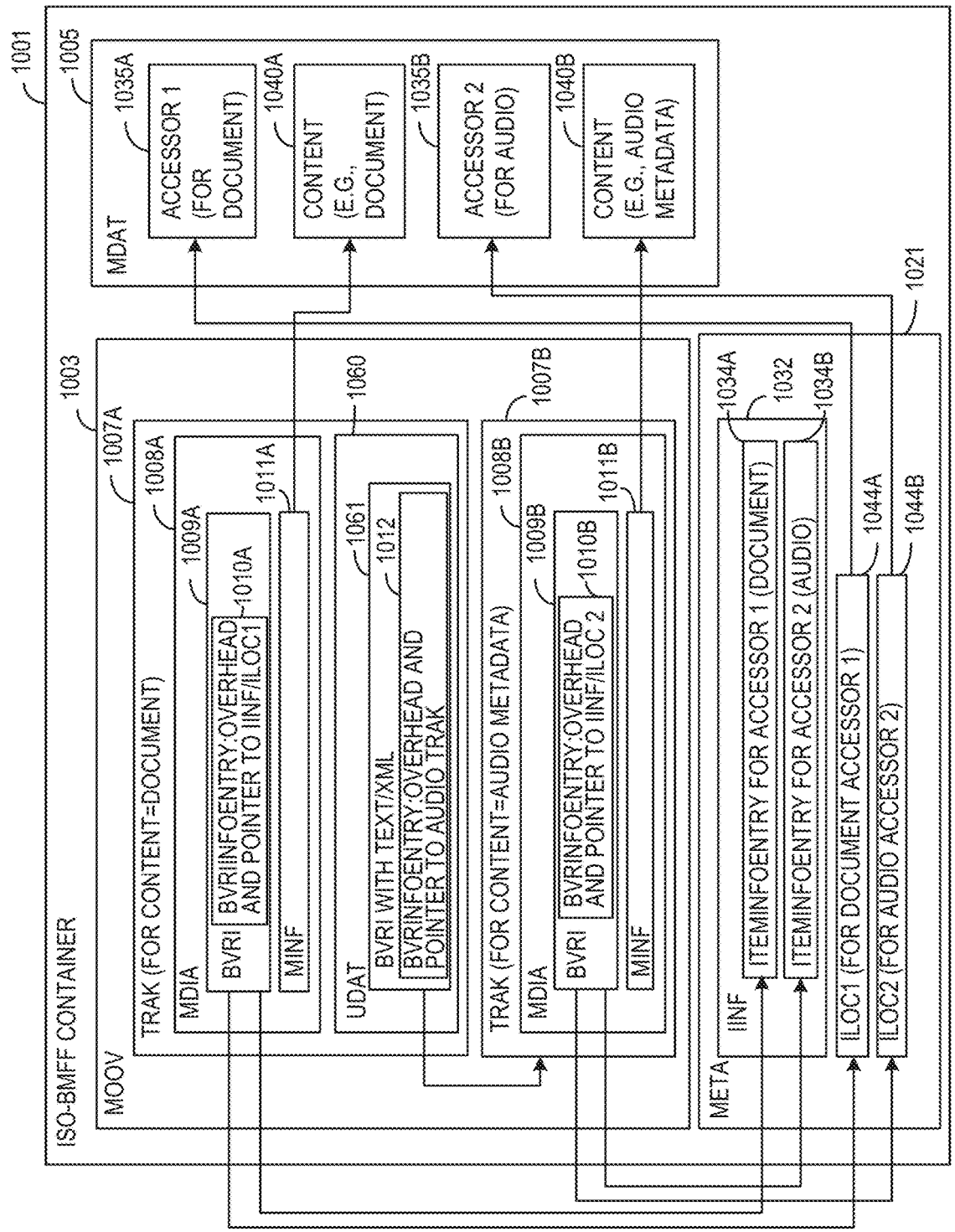
FIG. 10 shows another example of an ISO-BMFF container (e.g., a BVR container) format, according to some embodiments.
Figure 11:
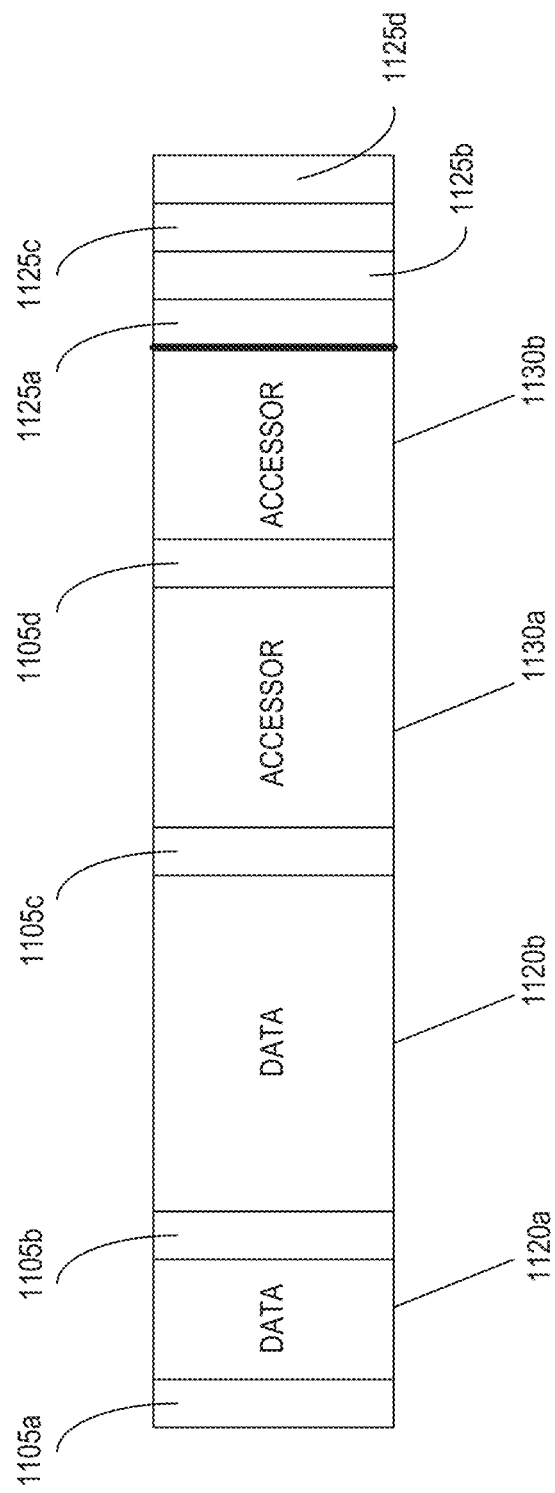
FIG. 11 shows an example of a ZIP format container (e.g., a BVR container), according to some embodiments.

BVR Container: A container including encoded data to be decoded and one or more accessors configured to decode encoded data, in some cases for subsequent rendering, processing, presentation, or other manipulation by one or more processing, output or display device(s). As shown further below, a single BVR container may contain one or more data files or data sets, which may be encoded in one or more different formats, and may also include one or more platform-independent accessors configured to decode data that has been encoded in one or more different formats. Examples of some BVR containers that have been developed by Bevara Technologies, LLC in Watertown MA are provided in FIGS. 3-11 and the corresponding description below. In the example BVR containers of FIGS. 4-10, the BVR containers use the ISO-BMFF format. In the example of FIG. 11, the BVR container uses the ZIP format.

Browser and Web Page: A browser is a computer program that provides functionality to a computer for executing syntax contained in web pages. The computer may be connected to a computer network, and the network may be, and usually will be, the Internet. As used herein, browsers and web pages together provide functionality to a computer connected to a network (e.g. the Internet) at least sufficient to request, retrieve, and render at least some network resources including web pages themselves, and to execute at least some links contained within or referred to in retrieved web pages to retrieve other web pages specified with the links. Web pages may include references such as uniform resource locators (URLs) and/or universal resource identifiers (URIs) to other network resources that contain images or other data that is retrieved by the browser from the network or from a cache memory when executing the web page, and may also include programs, libraries, style sheets, scripts, and the like which are executed in the browser environment when executing the web page. Executing some of these items may require prior separate loading of third party software onto the computer for the browser to utilize, and some may be executable natively by the browser itself. As browsers become more sophisticated, they tend to incorporate more functionality natively that may have been introduced originally as third-party code. Any of these items that are accessed, used, and/or retrieved during browser execution of web page syntax are considered to be included as a component of the "web page" as that term is used herein. Examples of browsers include, but are not limited to, Internet Explorer and Edge distributed by Microsoft, Firefox distributed by Mozilla, and Chrome distributed by Google. Example web page syntax that can be executed by browser engines include the various versions of HyperText Markup Language (HTML) promulgated by the World Wide Web Consortium (W3C).

Browser Engines and Browser Extensions: Browser engines and browser extensions generally run together as the "browser" on a given computing device. There is no strict functional demarcation defining what part of a browser is engine, and what part is extension. As used herein, the term browser engine is used to refer to the software code of a browser that provides basic navigation and syntax execution for a browser as described in the definition of Browser and Web Page set forth above. Software code that provides functionality to a browser beyond that provided by such a browser engine may be referred to herein as a browser extension. Browser extensions may perform functions such as displaying and executing toolbar functions on top of retrieved web pages or blocking browser engine retrieval of advertisements that would otherwise be downloaded in conjunction with web page execution. A browser extension is typically executed within browser allocated memory space anytime the browser engine is running on a computing device. Accordingly, a browser extension may be periodically, intermittently, or continuously monitoring operations of the browser engine and, in some cases as will be described in more detail below, intercepting one or more communications from and/or to the browser engine. Browsers such as Internet Explorer and Chrome provide internal functionality allowing them to interact with browser extension software code distributed by third parties so long as the third-party code complies with the interface for browser extensions provided with the browser. However, as used herein, the terms browser engine and browser extension are not distinguished by how they are developed or distributed. Rather, the browser engine is that part of browser code that provides basic navigation and syntax execution capabilities like http format communication, html page interpretation, script and code execution such as Java and WebAssembly, whereas the browser extension is that part of browser code that provides additional functionality beyond those basic functions.

Browser Plug-In: A browser plug-in is a computer program invoked by the browser and run in browser allocated memory specifically in response to the browser engine reading code that invokes the plug-in. Accordingly, a browser engine may operate for extended periods of time without invoking and/or loading a plug-in and a plug-in never intercepts communications not addressed to the plug-in. Moreover, plug-ins must be explicitly loaded and/or enabled by a user of a browser engine in response to the browser engine reading code requiring functionality of the plug-in. For example, the Adobe Flash plug-in provides functionality to a browser engine for decoding and rendering Flash video files in response to the browser engine finding a Flash video MIME type in a web page. Plug-Ins are becoming deprecated technology as their functionality is increasingly incorporated into the native code of browsers themselves.

Server: Software executing on processing hardware coupled to a computer network having network resources accessible thereto that is configured at least in part to respond to client access requests to use or retrieve the network resources accessible to the server. Two or more different servers may be executing in parallel on a single hardware component such as a microprocessor or computer. A particular piece of computer hardware that is executing server software may also be referred to as a server.

Client: Software executing on processing hardware coupled to a computer network configured at least in part to issue requests to servers to use or retrieve network resources accessible to servers. Two or more different clients may be executing in parallel on a single hardware component such as a microprocessor or computer. Both clients and servers may be executing in parallel on a single hardware component such as a microprocessor or computer. A client executing on a processor may issue a request to a server executing on the same processor, which may respond to that client request. A particular piece of computer hardware that is executing client software may also be referred to as a client. A particular piece of computer hardware may be a client and a server at the same time.

Internet: The globally interconnected system of computers and computer networks that evolved from ARPANET and NSFNET over the late 1980s and early 1990s that may utilize TCP/IP network communication protocols.

Network Resource Identifier: A definition of a network resource (e.g. by storage location and filename) that is used by client computers to specify a network resource in access requests issued to the network by the client computers. A network resource identifier may also be referred to as a location of a network resource such as an image or a web page. Currently, when the network is the Internet, Network resource identifiers are known as URLs that are formatted in accordance with RFC 3986 of the Internet Engineering Task Force (IETF). For the purposes of this disclosure, any format for specifying a network resource in client access requests issued to a network is within the definition of the term Network Resource Identifier. A network resource identifier, including URLs as currently defined on the Internet, may further include data in addition to data identifying the network resource that a server hosting the network resource associated with the network resource identifier may use for other purposes beyond identifying the requested network resource.

Web Site: A collection of network resources including at least some web pages that share a common network resource identifier portion, such as a set of web pages with URLs sharing a common domain name but different pathnames.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C. In some embodiments, a web server may also be a content server.

World Wide Web: The collection of web pages stored by and accessible to computers running browsers connected to the Internet that include references to each other with links.

Link: Syntax that instructs a browser executing the syntax to access a resource such as a network resource that is defined directly or indirectly by the syntax. The link syntax and/or internal browser engine functionality may also define conditions under which the access request is made by the browser engine, for example through cursor position and/or other interaction with an I/O device such as a keyboard or mouse. Some link syntax may cause the browser engine to access the specified network resource automatically while processing the syntax without user prompt or interaction. Links include HTML hyperlinks. A link may be directly coded with, for example, HTML tags and an explicit URL, or may be in the form of a script or other called function defined in a browser, in a browser extension, and/or in a webpage.

Network Resource: A web page, file, document, program, service, or other form of data or instructions which is stored on a network node and which is accessible for retrieval and/or other use by other network nodes.

Redirection Response: A response that may be provided by a server when processing an access request of a client for a network resource, wherein the response includes a network resource identifier of a different network resource that the client should access for the desired information or action. In the HTTP protocol, a redirection response may also include a 303 status code, and the client receiving the redirection response may then send a GET or other request for the network resource identified by the URL provided in the response.

Navigate: Controlling a browser to use a series of links to access a series of network resources.

Platform-independent: Software is platform-independent if it is not written specifically for execution by a particular operating/file system and/or a particular physical processing architecture. Platform-independent software generally executes inside another piece of software such as a browser or virtual machine that is not itself platform independent. Examples of platform-independent languages include but are not limited to Java and WebAssembly and, accordingly, platform-independent algorithms as described herein may comprise algorithms written in such platform-independent languages.

WebAssembly: A platform-independent programming language developed by W3C which can be executed within some browsers. It is similar to Java in that browsers can interpret WebAssembly code for execution on the underlying OS and hardware but WebAssembly is considered more efficient in its utilization of those underlying resources. Modules of WebAssembly code can run inside JavaScript. WebAssembly modules can be written in a human readable text format and compiled into WebAssembly syntax that is executable by browser software. Tools are also available that can compile programs written in other programming languages such as C into WebAssembly syntax files executable in browsers.

Figure 1:
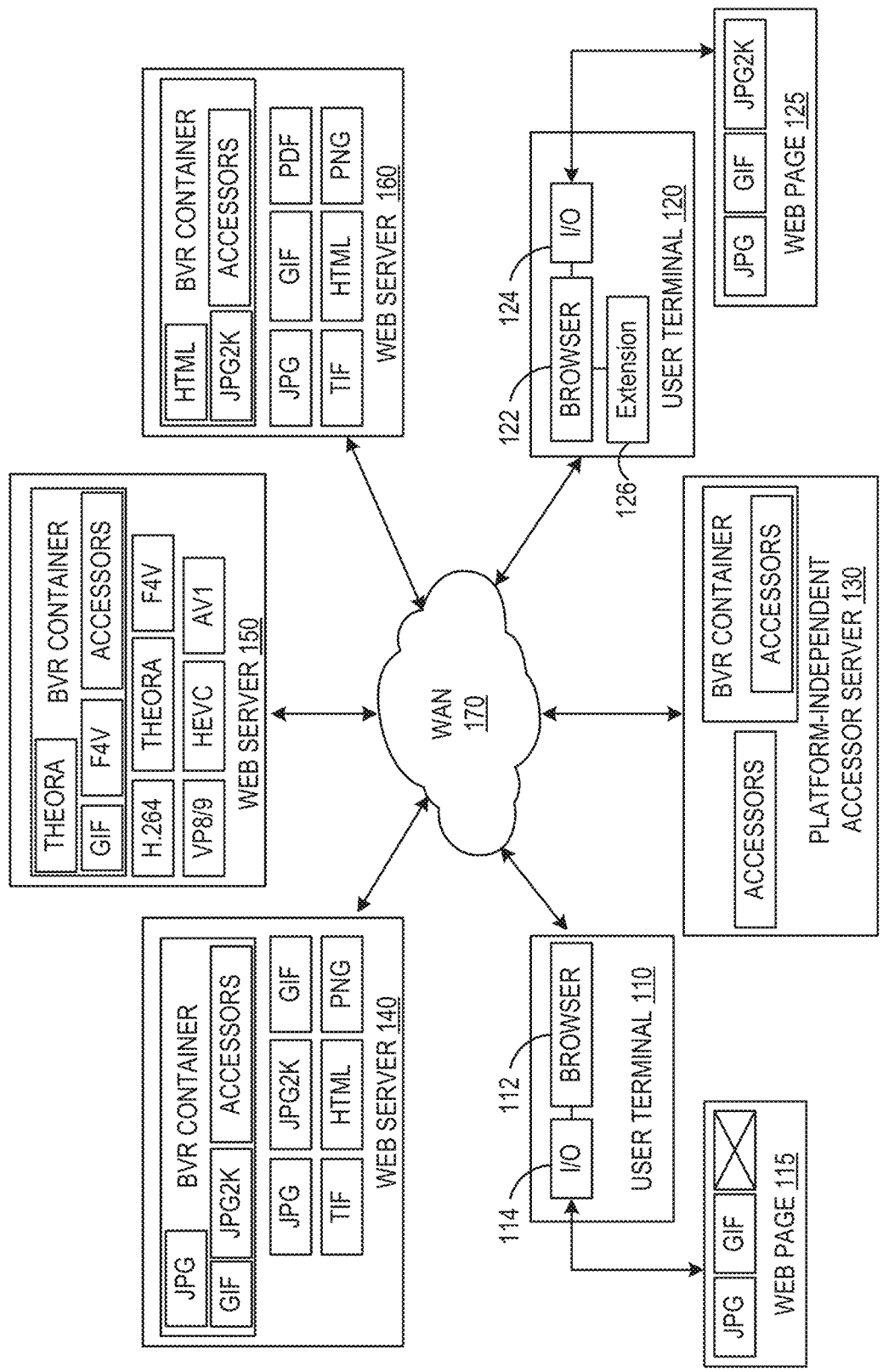
FIG. 1 shows an example of a network comprising one or more web browsers, a wide area network (WAN), one or more web servers, and a platform-independent decoder server, according to some embodiments.
Figure 2:
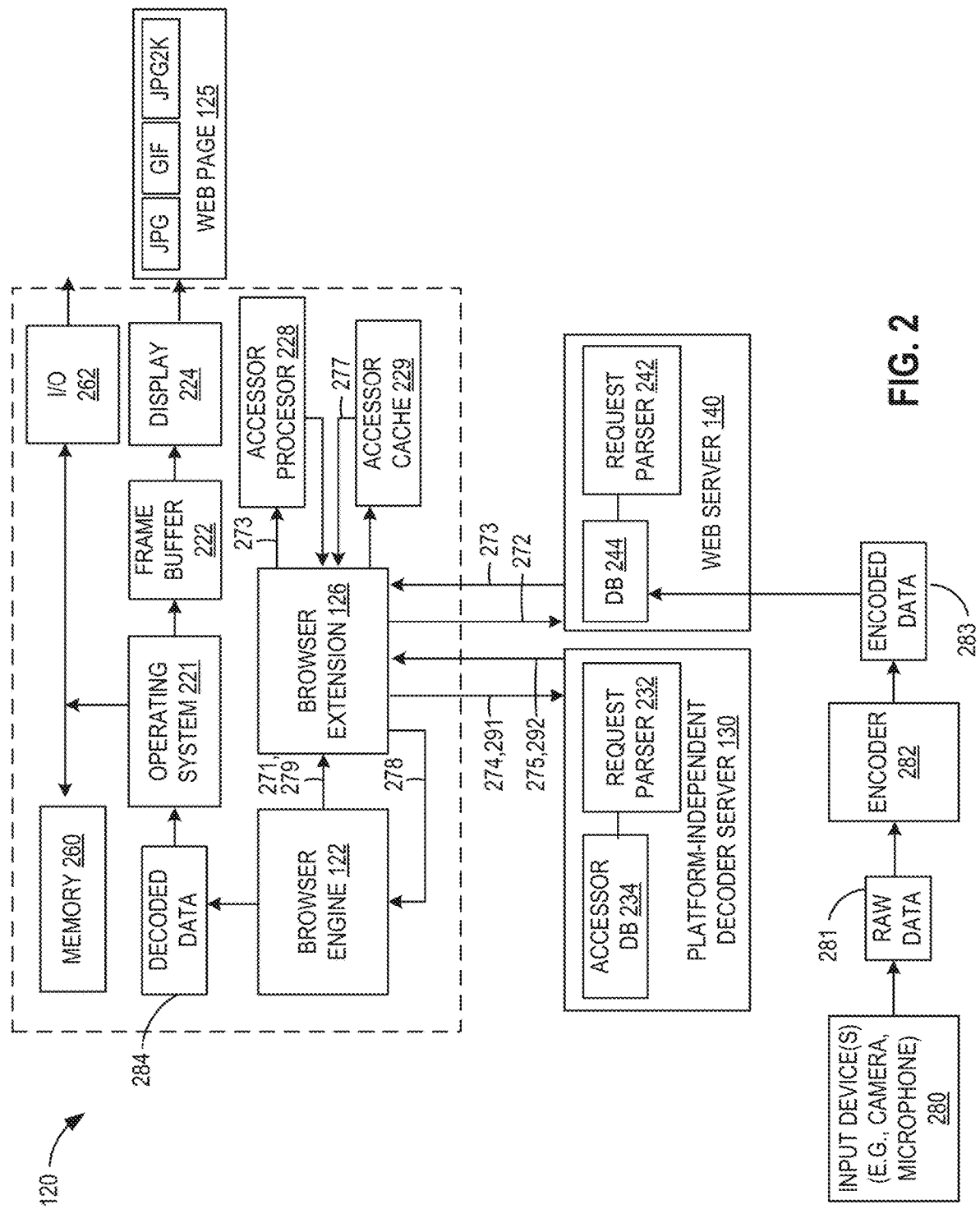
FIG. 2 is a flow chart illustrating several structural aspects of a decoding apparatus capable of performing any of the browser navigation and/or flexible decoding methods disclosed herein, according to some embodiments.

FIG. 1 shows an example of a network comprising user terminals 110, 120 comprising respective web browser engines 112, 122, a wide area network (WAN) 170, one or more web servers 140, 150, 160, and a platform-independent accessor server 130, according to some embodiments. FIG. 2 is a block diagram including several structural aspects of a decoding apparatus capable of performing any of the browser navigation and/or flexible decoding methods disclosed herein, such as user terminal 120 of FIG. 1, according to some embodiments. Functionality of several implementations of the present disclosure will now be described in connection with FIGS. 1 and 2 below.

As shown in FIG. 2, one or more input device(s) 280 may be configured to generate raw data 281. As a non-limiting example, input device 280 may comprise a camera configured to generate one or more raw image or video files and a microphone configured to generate one or more raw audio files. However, the present disclosure is not so limited and input device 280 may be configured to generate any type of raw data, and the raw data 281 can be of any type and generated in any manner. The raw data 281 is fed into an encoder 282 configured to compress, synchronize, manipulate into one or more container formats, modify for error resilience, and/or otherwise encode raw data 281 into encoded data 283. In some embodiments, encoder 282 may be intrinsic to input device 280. In some other embodiments, encoder 282 may be separate from input device 280. Encoded data 283 may be stored in one or more content or web servers, e.g., servers 140, 150, 160 of FIG. 1, which may be communicably coupled or couplable with one or both of user terminals 110, 120 via WAN 170, which may be the Internet. Although in the specific implementation of FIG. 1, the servers and user terminals are connected over a WAN, the invention is not so limited, and one or more servers could be connected in other ways such as over a LAN or even be resident as software on a single physical device. Examples of such encoded data 283 may comprise image file formats such as JPEG, GIF, TIF, JPEG-2000, video file formats such as H.264 (MP4), Theora, F4V (Flash), VP8, VP9, HEVC or AV1, document or web page file formats such as PDF, HTML, or any other encoded or unencoded file types. In addition, one or more encoded files may be stored in one or more of servers 140, 150, 160 in a BVR container (see FIGS. 4-11), which in addition to including the one or more encoded files may further include one or more accessors comprising platform-independent syntax that implement one or more algorithms to decode the encoded files in the container. In one advantageous embodiment, the platform-independent syntax for the accessors is written in WebAssembly language. Moreover, although particular file types are illustrated as being stored in servers 140, 150, 160, the present disclosure is not so limited and any of servers 140, 150, 160 may have stored thereon any file(s), file type(s) or format(s).

As shown in FIG. 1, conventional user terminal 110 may be in communication with at least some of servers 140, 150, 160 via WAN 170 and may comprise conventional browser engine 112 in communication with an input/output device 114 configured to display at least a portion of a web page 115.

To retrieve a network resource, such as web page 115, browser engine 112 may send a request for a network resource (e.g. an HTTP Request) to web server 140 via WAN 170. In response to the request, web server 140 generates a response (e.g. an HTTP Response) which is transmitted back to browser engine 112 via WAN 170. The response may include the network resource, for example web page 115. Browser engine 112 renders web page 115 including any content for which it has appropriate decoders. This may include a JPEG and a GIF image, for example. For an image for which browser engine 112 doesn't have a decoder, such as a JPEG-2000 image for example, browser engine 112 is incapable of decoding and rendering such an image and may instead render a blank rectangle as a placeholder for the unrendered and/or undecoded image. Accordingly, conventional rendering of such an image would further require a user of user terminal 110 to explicitly download and instantiate an additional software program specifically designed to operate on/with browser engine 112 and decode such JPEG-2000 images, a requirement that would preclude seamless, transparent decoding and rendering of content to a user of user terminal 110.

U.S. Pat. No. 8,995,534, U.S. Pat. App. Pub. No. 2015/0334413, and U.S. Pat. App. Pub. No. 2015/0331870, all of which are incorporated by reference herein in their entireties, describe systems and methods for generating accessor functionality. Instead of converting digital data to one or more new formats, a platform-independent accessor that can decode the encoded data may be packaged with the encoded data. This ensures that there is no conversion loss and minimal additional storage or transmission requirements. However, the digital data, associated metadata, and accessor may still require significant amounts of storage space, may require certain rights, or may have evolving features. Accordingly, a content generator or content provider may not wish to package the full-featured platform-independent accessor with the digital data or may wish to provide both packaged and unpackaged versions but still want data receivers to be able to display or playback all or a portion of data received.

To address this concern, implementations and embodiments described herein may intercept network resource requests or other messages from browser engines and look for data requests that can't be handled natively by the browser engine. For example, a browser engine might request an image or data file that it doesn't have the software to decode. Alternatively, the browser engine might request one or more BVR containers and may or may not have native support for accessing data files packaged in such containers. Implementations and embodiments described herein may produce seamless handling of file formats, using platform-independent accessors, without a user having to manually authorize, install or instantiate an accessor for every single format and also without browser engines having to build native support for every single format. For example, utilizing implementations described herein, a user of user terminal 120 (FIG. 1) may be enabled to access encoded data for which browser engine 122 does not have native decoding and/or interpreting ability, without being prompted to download and/or install additional decoding software, thus providing a seamless browsing experience both to the user and to browser engine 122.

Described herein are several implementations and sub-options, described in connection with at least FIGS. 1 and 2 and user terminal 120, based on whether browser engine 122 requests a BVR container or data comprising another file-type that is not natively supported by browser engine 122, and based on whether browser engine 122 can support BVR containers natively. As will be described in more detail below, the present disclosure may include, describe, or utilize software configured to function in association with browser engines such as, but not limited to Chrome, Safari, Firefox, Opera, Internet Explorer, and Edge.

FIG. 2 is a block diagram of a digital data processing apparatus (e.g., user terminal 120 of FIG. 1) capable of performing any one or more of the browser engine navigation and/or flexible decoding methods disclosed herein, according to some embodiments. FIG. 2 illustrates user terminal 120 comprising browser engine 122, a browser extension 126, an accessor processor 228, a accessor cache 229, an operating system 221, a frame buffer 222 and a display 224. Display 224 may correspond to at least a portion of I/O device 124 of user terminal 120 illustrated in FIG. 1. The operating system 221 may be further coupled to memory 260 and other I/O devices 262. Browser engine 122 may be in communication with operating system 221 and may be configured to ultimately provide decoded data 284 to operating system 221, which may provide decoded data 284 to frame buffer 222, which may provide decoded data 284 to display 224, which may be configured to render a decoded version of data 284 to, for example, a user of user terminal 120. Rendering may comprise generating and/or formatting for single- or multi-dimensional audio, visual, and/or tactile interfaces (e.g., I/O device 124). As noted above, the decoded data may not be all or even any audio or visual data, and accordingly the decoded data will not necessarily be displayed. In some cases, the decoded data 284 can be stored in a memory 260 for further manipulation or processing. Browser extension 126 and/or browser engine 122 may be configured to communicate with one or more servers (e.g., first content or web server 140, second content or web server 150, third content or web server 160 and/or decoder (accessor) server 130), via WAN 170, as will be described in more detail below.

In some implementations, for example first and second implementations described below, browser engine 122 is configured to natively support accessors provided in BVR containers. For example, for BVR containers that include accessors written in WebAssembly, browser engine 122 may be configured to interpret WebAssembly syntax to instantiate and execute the accessor software.

In some other implementations, for example third and fourth implementations described below, browser engine 122 is not configured to natively support accessors provided in BVR containers. For example, for BVR containers that include accessors written in WebAssembly, browser engine 122 may not be configured to interpret WebAssembly syntax, and therefore may not be able itself to instantiate and execute the accessor software. In these embodiments, an accessor processor 228 may be provided coupled to or part of browser extension 126 to instantiate one or more accessors, by executing WebAssembly syntax for example to decode received encoded data.

In some embodiments, browser extension 126 may also be known as, or comprise, an intercept engine and decision processor. In some embodiments, an accessor cache 229 may be provided coupled to or part of browser extension 126 to store one or more accessors locally with respect to user terminal 120. These and other embodiments and implementations will be described in more detail below.

Functionality of user terminal 120 will now be described in connection with a first implementation, in which browser engine 122 is configured to natively execute WebAssembly programs or another platform-independent programming language which can be used to write scripts/programs for/n-browser execution.

Browser engine 122 generates and transmits a request 271 (e.g., an HTTP request) for first encoded data. The first encoded data may comprise at least one file type that browser engine 122 does not natively support decoding of (e.g., Flash, XLS, or JPEG-2000 files). In some embodiments, request 271 is addressed to first content server 140.

Browser extension 126 is in communication with browser engine 122 and may intercept request 271 from browser engine 122. In response, browser extension 126 may reissue request 271, as request 272 (e.g., an HTTP request), to first content server 140 via WAN 170.

First content server 140 may comprise a request parser 242, which may comprise a general-purpose or special-purpose processor configured to perform one or more tasks, actions or steps as described below regarding server 140 (using HTTP protocols for example when the WAN is the Internet). Request parser 242 is configured to receive and parse request 272. First content server 140 may further comprise a database 244 storing the first encoded data associated with a network address. In response to receipt of request 272 from browser extension 126, first content server 140 may transmit the first encoded data in a generated response 273 (e.g., HTTP response) via WAN 170. Browser extension 126 may intercept the first encoded data transmitted from first content server 140.

In some embodiments, browser extension 126 may be configured to determine whether the first encoded data is embedded in a BVR container together with at least a first accessor written in a language supported by the browser engine 122 (e.g. WebAssembly), and if not, whether the first encoded data comprises at least one file type with an encoding format that is unsupported by browser engine 122. This determination can sometimes be made in advance of receiving the encoded first data. For example, an HTML document may include embedded MIME types for files to be retrieved to complete the page rendering process. In other cases, the data being requested will be of an unknown type until the data is received.

In response to a determination that the first encoded data is not embedded in a BVR container with the first accessor and that the first encoded data comprises at least one file type for which decoding is unsupported by browser engine 122, browser extension 126 may be configured to acquire a first accessor comprising a platform-independent program for decoding at least a portion of the first encoded data from platform-independent accessor server 130. Acquiring the first accessor from accessor server 130 may comprise generating and transmitting a request 274 to accessor server 130 and intercepting all or a portion of the first accessor in a response 275 from accessor server 130. For example, accessor server 130 may comprise a request parser 232, which may comprise a general-purpose or special-purpose processor configured to perform one or more tasks, actions or steps as described below regarding accessor server 130. Request parser 232 is configured to receive and parse request 274. Accessor server 130 may further comprise an accessor database 234 storing the first accessor and, in some embodiments, one or more additional accessors written in a platform-independent language that when executed (in a browser for example) will decode encoded data. In some embodiments, the first accessor may be embedded within a BVR container transmitted in response 275. In some embodiments, upon acquisition of the first accessor, browser extension 126 may store the first accessor in local accessor cache 229.

In some embodiments where the first accessor has already been previously stored in accessor cache 229, in response to the above determination(s), browser extension 126 may alternatively be configured to acquire the first accessor from local accessor cache 229 instead of accessor server 130.

The ability to acquire the first decoder from remote decoder server 130 via WAN 170 or from local accessor cache 229 when stored therein may allow for balancing between a required size of accessor cache 229 and an amount of data transmitted via WAN 170. For example, if the first accessor is already stored in accessor cache 229, acquiring the first accessor from accessor cache 229 rather than from remote accessor server 130 may reduce an amount of data transmitted via WAN 170. On the other hand, local accessor cache 229 may have a set amount of memory and may be configured to store and retain decoders based on some algorithm, for example first-in first-out (where, in order to make room to store new accessors as required, the oldest or first cached accessors are deleted first) or a most-used basis (where accessors having been least used in a prior period of time are deleted first, etc.) In such embodiments, acquiring the first accessor from remote accessor server 130 may allow for maintenance of a smaller amount of memory for accessor cache 229, since accessors can be more readily deleted from local accessor cache 229 and reacquired remotely on-demand.

Browser extension 126 may then point browser engine 122 to one or more local storage locations of the first encoded data and the first accessor by messaging the browser engine 122 over the browser extension API of the browser engine 122 for example, thereby facilitating browser engine 122 to subsequently render or otherwise manipulate or process a decoded version of the first encoded data. For example, browser extension 126 may generate a URL or URI addressed to the local storage location(s) of the first encoded multi-media data and the first decoder and transmit a notification 278 of the URL or URI to browser engine 122. Browser engine 122 then transmits, and browser extension 126 intercepts, a second request 279 (e.g., an HTTP request) for the first encoded multi-media data and the first decoder stored at the one or more local locations. Browser extension 126 then grants browser engine 122 access to the first encoded multi-media data and the first decoder at the one or more local storage locations. Browser engine 122 then decodes and/or interprets the first encoded multi-media data utilizing the first decoder comprising the platform-independent algorithm. Browser engine 122 may be configured to further take advantage of various plug-ins and/or protocols such as HTML5, which may allow browser engine 122 to support at least some decoders and/or decoder functionalities natively. Browser engine 122 then renders a decoded version of the first encoded multi-media data utilizing operating system 221, frame buffer 222 and display 224 of I/O device 124, for example, as web page 125 comprising a JPEG image, a GIF image, and a JPEG-2000 image.

In this first implementation, browser engine 122 is configured to support WebAssembly or another similar platform-independent programming language that the accessor is coded in, so browser engine 122 is able to execute the accessor directly decode first encoded data utilizing the platform-independent first accessor, even though browser engine 122 does not natively support the filetype(s) that the first accessor is configured to decode. Moreover, because browser extension 126 acts as intermediary for browser engine 122, the functionality may be transparent to both browser engine 122 and to the user of user terminal 120, neither having to perform any function to manually acquire or run the first accessor. Instead, browser extension 126 transparently intercepts, initiates, and routes necessary communications to provide browser engine 122 access to both the retrieved first encoded data and the first accessor at a local storage location.

Functionality of user terminal 120 will now be described in connection with a second implementation, in which browser engine 122 is configured to natively support WebAssembly or another similar platform-independent programming language, and where the first encoded multi-media data and the first accessor are both intercepted by browser extension 126 embedded in a BVR container.

Browser engine 122 generates and transmits request 271 (e.g., an HTTP request) for first encoded data. In some embodiments, request 271 is addressed to first content server 140. Browser extension 126 is in communication with browser engine 122 and may intercept request 271. In response, browser extension 126 may reissue request 271, as request 272 (e.g., an HTTP request), to first content server 140 via WAN 170.

In response to receipt of request 272 from browser extension 126, reissued in response to request 271 from browser engine 122, first content server 140 may transmit a BVR container, having embedded therein the first encoded data and the first accessor, in response 273 (e.g., HTTP response) via WAN 170. Browser extension 126 may intercept the BVR container, having embedded therein the first encoded data and the first accessor, from first content server 140.

In some embodiments, browser extension 126 may be configured to determine whether response 273 comprises a BVR container having embedded therein the first encoded data and the first accessor. In response to a determination that response 273 comprises a BVR container, browser extension 126 may unpack one or more encoded data files and accessors from the container to be stored as separate files, and point the browser engine 122 to one or more local storage locations of the first encoded data and the first accessor, thereby facilitating browser engine 122 to subsequently render, process, or otherwise manipulate a decoded version of the first encoded data. For example, browser extension 126 may message the browser engine 122 over its browser extension API with information about the storage locations of the encoded data and the accessor(s). Browser engine 122 then decodes the first encoded data utilizing the first platform-independent accessor. Browser engine 122 then renders, processes, output, or otherwise manipulates a decoded version of the first encoded multi-media data. Using web page rendering as an example, the user terminal 120 may display data from the BVR container utilizing operating system 221, frame buffer 222, and display 224 of I/O device 124, for example, as some or all of a web page 125 comprising a JPEG image, a GIF image, and a JPEG-2000 image.

In this second implementation, as in the first implementation, because browser engine 122 is configured to support WebAssembly or another similar platform-independent programming language, browser engine 122 is able to directly decode first encoded data utilizing the platform-independent first accessor, even though browser engine 122 does not natively support the filetype(s) for which the first accessor is configured to decode. Moreover, in this second implementation, because browser extension 126 acts as intermediary for browser engine 122 and determines that response 273 includes a BVR container having embedded therein the first encoded data and the first accessor for decoding at least a portion of the first encoded data, no separate acquisition of the first accessor is required or performed by the user of the terminal 120 or the browser engine 122. Instead, browser extension 126 transparently intercepts, initiates, and routes necessary communications and then, based on a determination that response 273 already includes both the first encoded data and the first accessor, provides browser engine 122 access to both at a local storage location.

Functionality of user terminal 120 will now be described in connection with a third implementation, in which browser engine 122 is not configured to natively support WebAssembly or another similar platform-independent programming language in which platform independent accessors that are stored in BVR containers or in accessor server 130 are written, in the third implementation, similar to the second implementation, the first encoded data and the first accessor are both intercepted by browser extension 126 embedded in a BVR container.

In this implementation, the browser engine 122 generates and transmits request 271 (e.g., an HTTP request) for first encoded data. In some embodiments, request 271 is addressed to first content server 140. Browser extension 126 is in communication with browser engine 122 and may intercept request 271. In response, browser extension 126 may reissue request 271, as request 272 (e.g., an HTTP request), to first content server 140 via WAN 170.

In response to receipt of request 272 from browser extension 126, reissued in response to request 271 from browser engine 122, first content server 140 may transmit a BVR container, having embedded therein the first encoded data and the first accessor, in response 273 (e.g., HTTP response) via WAN 170. Browser extension 126 may intercept the BVR container, having embedded therein the first encoded data and the first accessor, from first content server 140.

In some embodiments, browser extension 126 may be configured to determine whether response 273 comprises a BVR container having embedded therein the first encoded data and the first accessor. In response to a determination that response 273 comprises a BVR container, browser extension 126 may unpack the data and the accessor from the container and route at least a portion of response 273, e.g., the first encoded data and the first accessor, to accessor processor 228. Accessor processor 228 is configured to instantiate the first accessor and decode at least a portion of the first encoded data utilizing the first accessor written in a platform-independent syntax. Accessor processor 228 may thus comprise a WebAssembly execution engine that may be coupled to or be a part of the browser extension 126. Accessor processor 228 may then deliver to browser extension 126 a decoded version of the first encoded data, as shown by the arrow extending from accessor processor 228 to browser extension 126. The browser extension 126 may then store the decoded data in local browser memory space, and may discard the accessor, or in some implementations as described above, store the accessor in the accessor cache 229 for later retrieval and/or use without requiring re-retrieval from the accessor server 130.

Browser extension 126 may then point browser engine 122 to one or more local storage locations of the decoded version of the first encoded data, thereby facilitating the browser engine 122 to subsequently render or otherwise process or manipulate a decoded version of the first encoded data. In some implementations, browser extension 126 may include web server like functionality to point the browser engine for decoded data retrieval. In this case, the browser extension 126 may generate a redirect response that is sent to the browser engine 122 in response to the original data request 271 from the browser engine 122. This redirect response may include a URL or URI generated by the browser extension 126 for use by the browser engine in generating a subsequent request that is also intercepted by the browser extension 126. Thus, browser engine 122 may then transmit, and browser extension 126 may intercept, second request 279 (e.g., an HTTP request) for the decoded version of the first encoded data. Browser extension 126 then delivers the decoded data to browser engine 122 as if the browser engine retrieved it over the WAN. Browser engine 122 then renders, processes, or otherwise manipulates the decoded version of the first encoded data.

In this third implementation, if acting as an intermediary for browser engine 122, browser extension 126 determines that response 273 comprises a BVR container having embedded therein the first encoded data and the first accessor for decoding at least a portion of the first encoded data. Thus, as in the second implementation, no separate acquisition of the first accessor is required or performed. However, unlike the first and second Implementations, browser engine 122 is not configured to support WebAssembly or another similar platform-independent programming language for interpreting the accessor syntax and so is not able to directly decode first encoded data utilizing the platform-independent syntax of the first accessor. Accordingly, browser extension 126 transparently routes the first encoded data and the first accessor to decoder processor 228, which instantiates the first accessor, decodes the first encoded data utilizing the first accessor, and forwards the decoded version of the first encoded data to browser extension 126, Browser extension 126 may then point browser engine 122 to the decoded version of the first encoded data at a local storage location, for subsequent rendering, processing, manipulation, etc.

Functionality of user terminal 120 will now be described in connection with a fourth implementation, in which browser engine 122 is, like the third implementation, not configured to natively support WebAssembly or another similar platform-independent programming language which the accessors are coded in.

Browser engine 122 generates and transmits request 271 (e.g., an HTTP request) for first encoded data. The first encoded data may comprise at least one file type that browser engine 122 does not natively support (e.g., Flash, XLS, or JPEG-2000 files). In some embodiments, request 271 is addressed to first content server 140.

Browser extension 126 is in communication with browser engine 122 and may intercept request 271. In response, browser extension 126 may reissue request 271, as request 272 (e.g., an HTTP request), to first content server 140 via WAN 170.

In response to receipt of request 272 from browser extension 126, reissued in response to request 271 from browser engine 122, first content server 140 may transmit the first encoded data in response 273 (e.g., HTTP response) via WAN 170. Browser extension 126 may intercept the first encoded data transmitted from first content server 140.

In some embodiments, browser extension 126 may be configured to determine whether the first encoded data is embedded in a BVR container together with a first accessor comprising platform-independent syntax for decoding at least a portion of the first encoded data and, if not, whether the first encoded data comprises at least one file type that is unsupported by browser engine 122, e.g., a file type which browser engine 122 is unable to natively decode. Examples of such BVR containers are described in connection with FIGS. 4-11 below.

In response to a determination that the first encoded data is not embedded in a BVR container with the first accessor and that the first encoded data comprises at least one file type that is unsupported by browser engine 122, browser extension 126 may be configured to acquire the first accessor comprising a platform-independent syntax for decoding at least a portion of the first encoded data from remote accessor server 130. Acquiring the first accessor from accessor server 130 may comprise generating and transmitting request 274 to accessor server 130 and intercepting all or a portion of the first accessor in response 275 from accessor server 130. In some embodiments, the first accessor may be transmitted in response 275 embedded within a BVR container.

In some embodiments where the first accessor has already been previously stored in accessor cache 229, in response to the above determination(s), browser extension 126 may alternatively be configured to acquire the first accessor from local accessor cache 229.

As previously described in connection with the first implementation above, the ability to alternatively acquire the first accessor from remote accessor server 130 via WAN 170 or from local accessor cache 229 when stored therein may allow for balancing between a required size of accessor cache 229 and an amount of data transmitted via WAN 170.

Browser extension 126 may route at least a portion of response 273, e.g., the first encoded data, and at least a portion of response 275, e.g., the first accessor), to accessor processor 228. Accessor processor 228 is configured to instantiate the first accessor and decode at least the unsupported filetype of the first encoded data utilizing the first accessor comprising the platform-independent syntax. Accessor processor 228 then outputs a decoded version of the first encoded data. The browser extension 126 may then point the browser engine 122 to the decoded data in any manner described for the other embodiments above.

In this fourth implementation, if acting as an intermediary for browser engine 122, browser extension 126 determines that the first encoded data of response 273 does not comprise a BVR container but does comprise at least one filetype that browser engine 122 does not natively support. Thus, as in the first implementation, acting as an intermediary for browser engine 122, browser extension 126 transparently requests and intercepts the first accessor comprising the platform-independent syntax for decoding at least the unsupported filetype of first encoded data. However, unlike the first and second implementations, browser engine 122 is not configured to support WebAssembly or another similar platform-independent programming language and so is not able to directly decode at least the unsupported file type of first encoded data utilizing the platform-independent algorithm of the first accessor. Accordingly, browser extension 126 transparently routes the first encoded data and the first accessor to accessor processor 228, which instantiates the first accessor, decodes the first encoded data utilizing the first accessor, and forwards the decoded version of the first encoded data to browser extension 126. Browser extension 126 then transparently routes browser engine 122 to the decoded version of the first encoded data at a local storage location, for subsequent rendering, processing, or other manipulation.

Potential additional and/or alternative features of the above-described implementations will now be described.

In some embodiments, a BVR container intercepted from first content server 140 in response 273 (see e.g., second and third implementations described above) may be a partial-feature BVR container. For example, such a BVR container may comprise the first encoded data and the first accessor. However, the first accessor may include a platform-independent program for decoding only a portion of the first encoded data, while a second accessor, including different/additional platform-independent code for decoding additional features of the first encoded data, that is not included in the BVR container would need to be acquired before full decoding of the first encoded data may be accomplished. Accordingly, browser extension 126 may be configured to determine whether the BVR container is such a partial-feature BVR container (e.g., whether the first encoded data comprises at least one feature unsupported by the first accessor embedded in the BVR container) and, if so, browser extension 126 may be configured to acquire a second accessor comprising second platform-independent syntax for the at least one additional feature not supported by the first accessor in the BVR container. Acquiring the second accessor from accessor server 130 may comprise generating and transmitting a request 291 to accessor server 130 and intercepting all or a portion of the second accessor in a response 292 from accessor server 130.

In some embodiments, browser extension 126 is configured to analyze at least one of browser permissions and user preferences to generate one or both of request 274 for the first accessor and request 291 for the second accessor as previously described. In some embodiments, browser extension 126 is configured to perform at least one of an integrity check, data rights management, software rights management, decryption, and virus detection on at least one received response, for example, response 273 (either comprising a BVR container having embedded therein the first encoded data and the first accessor or comprising the first encoded data), response 275 (comprising the first accessor), or response 292 (comprising the second accessor).

The systems and methods described herein provide much more flexibility and convenience with respect to these issues than conventional systems. Much of this flexibility is provided by the fact that the different platform-independent accessors available from the database will advantageously differ not just by what file type they can decode but also by quality metrics, data manipulation capabilities, and any number of other parameters. For example, the Chrome browser includes a built-in pdf file accessor. However, this pdf accessor has limited functionality. If the user obtains a pdf file while browsing with Chrome and wants to manipulate that document in more extensive ways than the Chrome pdf file accessor allows, the user must download the pdf file to a local operating system folder and re-open it with a local Adobe Acrobat program that is not platform independent and that had to be separately acquired by the user. This local application program has data manipulation features that are commensurate in scope with the license to that program purchased by the user when it was acquired. With the browser configuration and platform independent accessor server 130 described herein, multiple pdf accessors of varying capability can be stored or assembled for delivery by the platform independent accessor server 130. Furthermore, user rights and preferences with respect to data and its use can be delivered to the browser or browser extension in many ways, including via log-in credentials, system configuration monitoring by the browser, or obtained by the browser or browser extension from the content server when the data is retrieved. This information can be used by the browser to retrieve an accessor from the accessor server 130 that is not only appropriate for the file type retrieved from the content server but also for the license permissions applicable to the user and any particular user preferences, enterprise preferences, security preferences, etc. that may be input to or otherwise known to the browser.

In some embodiments, browser extension 126 may be configured to redirect request 272 to a server different from a server to which request 271 is originally addressed by browser engine 122. For example, request 271 for first encoded data may alternatively be addressed to, and initially request the first encoded data from, second server 150. However, browser extension 126 may be aware that first server 140 is currently storing the first encoded data or a BVR container having the first encoded data therein or may be aware of particular geographical or permission-based limitations associated with first server 140 or second server 150. In such embodiments, browser extension 126 may intercept first request 271 addressed to second server 150 from browser engine 122, and reformat first request 271, as request 272 addressed to first content server 140.

In some embodiments, browser extension 126 may be configured to generate and/or replace at least one embedded control within a received BVR container. An effect of such generation and/or replacement may comprise a change in one or more of branding, a look-and-feel, link(s) to other site(s), ads, metadata or other host content embedded within the BVR container.

Several process flowcharts, corresponding to the above-described implementations, are described in more detail in connection with FIGS. 3A-3C below. Although particular steps, actions or blocks are described below. The present disclosure is not so limited and one or more additional or alternative steps, actions or blocks may also be utilized, one or more steps, actions or blocks may be omitted, or a different ordering may be utilized without departing from the scope of the disclosure.

Figure 3A:
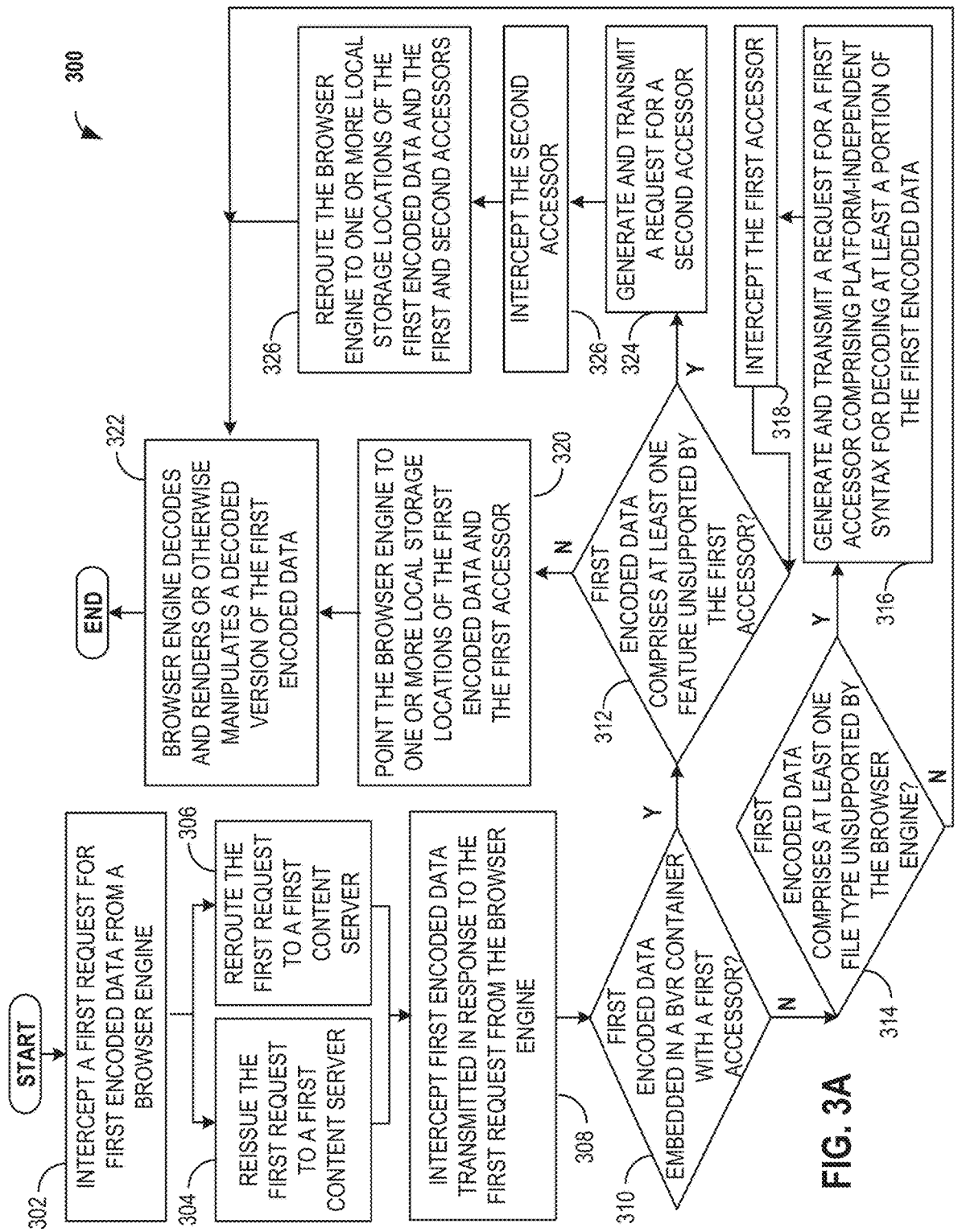
FIG. 3A illustrates a flowchart of a method of flexibly decoding and rendering a variety of multi-media data, in accordance with some embodiments.

FIG. 3A illustrates a flowchart 300 of a method of flexibly decoding and rendering a variety of digital data, in accordance with some embodiments. Flowchart 300 may correspond to operations of browser extension 126 for at least the first and second implementations described above, wherein browser engine 122 is configured to support BVR containers natively (e.g., browser engine 122 is configured to support WebAssembly or another similar platform-independent programming language).

Flowchart 300 begins at the START block and proceeds to block 302, which includes intercepting a first request for first encoded data from a browser engine. For example, as previously described in connection with FIGS. 1 and 2, browser engine 122 generates and transmits request 271 for first encoded data and browser extension 126 may intercept request 271 from browser engine 122.

Flowchart 300 proceeds to either block 304 or block 306, where browser extension 126 either reissues or reroutes the first request to a first content server. For example, as previously described in connection with FIGS. 1 and 2, if request 271 was originally addressed to first content server 140, browser extension 126 may reissue request 271, as request 272, to first content server 140 via WAN 170. On the other hand, if request 271 was originally addressed to a particular server (e.g., second content server 150) and browser extension 126 determines the request should be sent to a different server (e.g., first content server 140), browser extension 126 may reroute request 271, as request 272, to first content server 140 via WAN 170.

Flowchart 300 proceeds to block 308, which includes intercepting first encoded data transmitted in response to the first request from the browser engine. For example, as previously described in connection with FIGS. 1 and 2, first content server 140 may transmit the first encoded data in response 273 via WAN 170 and browser extension 126 may intercept the first encoded data transmitted from first content server 140. In embodiments where browser extension 126 is not configured to intercept requests from browser engine 122, flowchart 300 may advance from the START block directly to block 308.

Flowchart 300 proceeds to block 310, which includes determining whether first encoded data is embedded in a BVR container with a first accessor. For example, as previously described in connection with FIGS. 1 and 2, browser extension 126 may be configured to determine whether the first encoded data is embedded in a BVR container together with a first accessor comprising platform-independent syntax for decoding at least a portion of the first encoded data. In response to a determination that first encoded data is embedded in a BVR container, flowchart 300 may proceed to block 312.

In response to a determination that first encoded data is not embedded in a BVR container, flowchart 300 may alternatively proceed to block 314, which includes determining whether the first encoded data comprises at least one file type unsupported by the browser engine. For example, as previously described in connection with FIGS. 1 and 2, browser extension 126 may determine whether first encoded data comprises at least one file type that is unsupported by browser engine 122, e.g., a file type which browser engine 122 is unable to natively decode. In response to a determination that first encoded data does not comprise at least one file type unsupported by the browser engine, flowchart 300 may advance to block 322.

In response to a determination that first encoded data comprises at least one file type unsupported by the browser engine, flowchart 300 may advance to block 316, which includes generating and transmitting a request for a first accessor comprising platform-independent syntax for decoding at least a portion of the first encoded data. For example, as previously described in connection with FIGS. 1 and 2, browser extension 126 may generate and transmit either request 274 to accessor server 130 or request 276 to local accessor cache 229.

Flowchart 300 advances to block 318, which includes intercepting the first accessor. For example, as previously described in connection with FIGS. 1 and 2, browser extension 126 may intercept all or a portion of the first accessor in response 275 from accessor server 130 or in response 277 from local accessor cache 229. The operations of blocks 316 and 318 may, together, be considered acquiring the first accessor comprising platform-independent syntax for decoding at least a portion of the first encoded data.

Flowchart 300 advances to block 312, which includes determining whether the first encoded data comprises at least one feature unsupported by the first accessor. For example, as previously described in connection with FIGS. 1 and 2, browser extension 126 may determine whether the first encoded data comprises at least one feature unsupported by the first accessor. In some embodiments, this determination may be carried out in either condition where the first encoded data is embedded in a BVR container or where the first encoded data is not embedded in a BVR container.

In response to a determination that the first encoded data does not comprise at least one feature unsupported by the first accessor, flowchart 300 may advance to block 320, which includes pointing the browser engine to one or more local storage locations of the first encoded data and the first accessor. For example, as previously described in connection with FIGS. 1 and 2, browser extension 126 may reroute browser engine 122 to one or more local storage locations of the first encoded data and the first accessor, thereby facilitating browser engine 122 to subsequently render or otherwise process or manipulate a decoded version of the first encoded data at block 322.

In response to a determination that the first encoded data comprises at least one feature unsupported by the first accessor, flowchart 300 may advance to block 324, which includes generating and transmitting a request for a second accessor. For example, as previously described in connection with FIGS. 1 and 2, browser extension 126 may generate and transmit request 291 to accessor server 130 or a request similar to request 276 to local accessor cache 229.

Flowchart 300 proceeds to block 326, which includes intercepting the second accessor. For example, as previously described in connection with FIGS. 1 and 2, browser extension 126 may intercept all or a portion of the second accessor in response 292 from accessor server 130 or in a response similar to response 277 from local accessor cache 229. The operations of blocks 324 and 326 may, together, be considered acquiring a second accessor implementing a second platform-independent syntax for the at least one additional feature not supported by the first accessor.

Flowchart 300 proceeds to block 328, which includes pointing the browser engine to one or more local storage locations of the first encoded data and the first and second accessors. For example, as previously described in connection with FIGS. 1 and 2, browser extension 126 may point browser engine 122 to one or more local storage locations of the first encoded data and the first and second accessors, thereby facilitating browser engine 122 to subsequently render, process, or manipulate a decoded version of the first encoded data at block 322.

At block 322, the browser engine decodes and renders, processes, manipulates, or outputs the decoded version of the first encoded data. For example, as previously described in connection with FIGS. 1 and 2, browser engine 122 may as one example, render a decoded version of the first encoded data utilizing, for example, one or more of operating system 221, frame buffer 222, and display 224 of I/O device 124, for example, as web page 125 comprising a JPEG image, a GIF image, and a properly decoded, interpreted and rendered JPEG-2000 image. Flowchart 300 may then advance to END block.

Figure 3B:
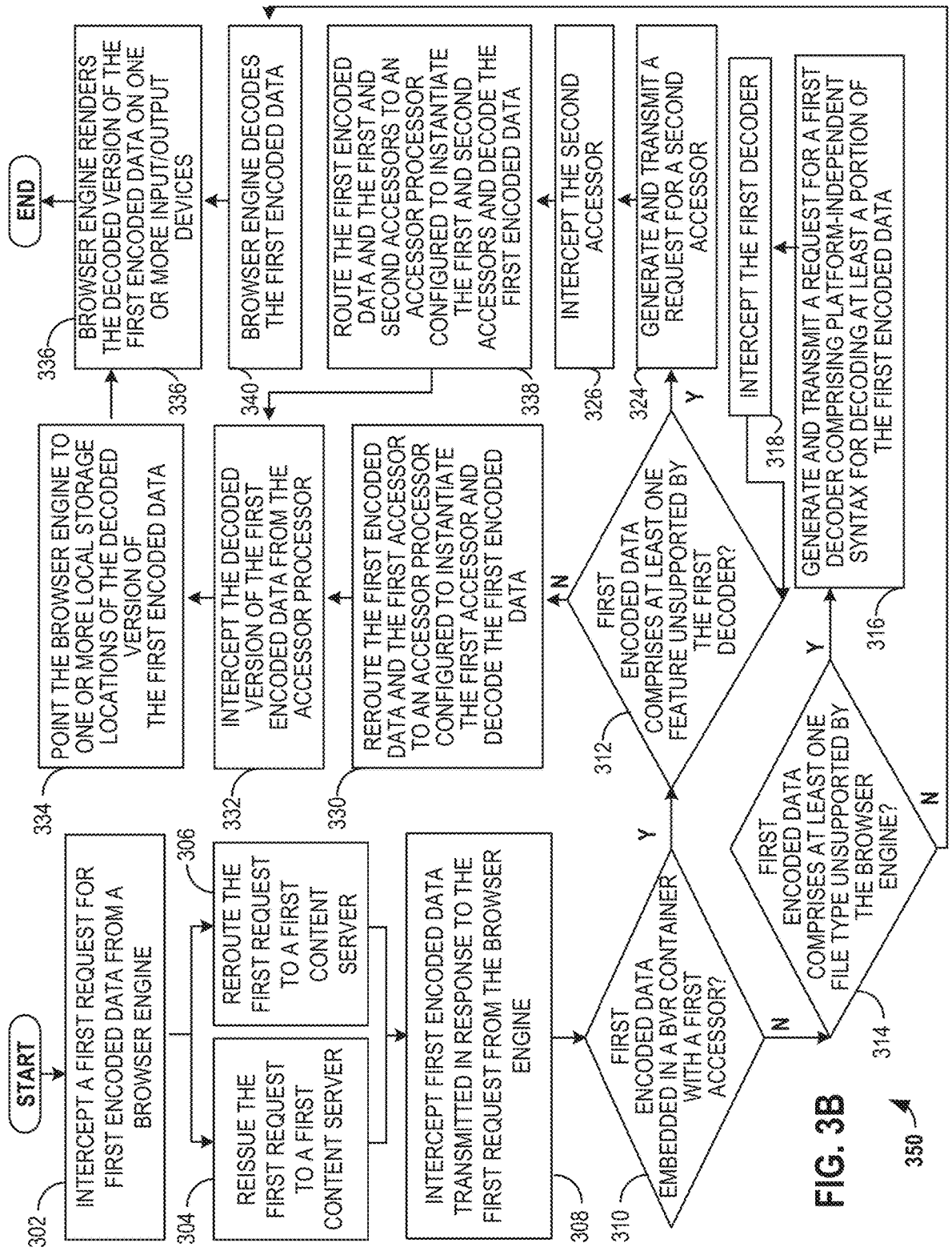
FIG. 3B illustrates another flowchart of a method of flexibly decoding and rendering a variety of multi-media data, in accordance with some embodiments.

FIG. 3B illustrates another flowchart 350 of a method of flexibly decoding a variety of digital data, in accordance with some embodiments. Flowchart 350 may correspond to operations of browser extension 126 for at least the third and fourth implementations described above, wherein browser engine 122 is not configured to support BVR containers natively (e.g., browser engine 122 is not configured to support WebAssembly or another similar platform-independent programming language) and such decoding and/or interpreting of the first encoded data utilizing at least the first accessor is seamlessly and transparently handled by accessor processor 228 rather than by browser engine 122.

As can be seen by comparison of FIGS. 3A and 3B, flowchart 350 includes some of the same blocks as flowchart 300. For example, blocks 302, 304, 306, 308, 310, 312, 314, 316, 318, 324 and 326 are substantially the same between flowchart 300 and flowchart 350. Accordingly, their descriptions will not be repeated here.

From block 314, in response to a determination by the browser extension that the first encoded data does not comprise at least one file type unsupported by the browser engine (and previously that the first encoded data was not embedded in a BVR container with the first accessor), flowchart 350 advances to block 340, which includes the browser engine decoding the first encoded data. For example, if the first encoded data does not include any file types or features unsupported by browser engine 122, browser engine 122 may itself decode the data. Flowchart 350 would then advance to block 366.

Jumping back to block 312, in response to a determination that the first encoded data does not comprise at least one feature unsupported by the first accessor, flowchart 350 advances to block 330, which includes rerouting the first encoded data and the first accessor to an accessor processor configured to instantiate the first accessor and decode the first encoded data. For example, as previously described in connection with FIGS. 1 and 2, browser extension 126 may reroute at least a portion of response 273, e.g., the first encoded data and the first accessor in a BVR container, or of responses 273 and 275, e.g., the first encoded data and the first accessor respectively, to accessor processor 228. Accessor processor 228 instantiates the first and second accessors and decodes at least a portion of the first encoded data utilizing the first platform-independent syntax of the first decoder and the second platform-independent syntax of the second decoder. Flowchart 350 advances to block 338.

Jumping back to block 326 of flowchart 350, where a second accessor is needed or desired for decoding at least a portion of the first data, upon intercepting the second accessor as previously described for flowchart 300, flowchart 350 advances to block 338, which includes routing the first encoded data and the first and second accessors to an accessor processor configure to instantiate the first and second accessors and decode the first encoded data. For example, as previously described in connection with FIGS. 1 and 2, browser extension 126 may route at least a portion of response 273, e.g., the first encoded data and the first accessor in a BVR container, or of responses 273 and 275, e.g., the first encoded data and the first accessor respectively, and at least a portion of response 292, e.g., the second accessor, to accessor processor 228. Accessor processor 228 instantiates the first and second accessors and decodes at least a portion of the first encoded data utilizing the first platform-independent syntax of the first accessor and the second platform-independent syntax of the second decoder. Flowchart 350 advances to block 338.

Block 338 includes intercepting the decoded version of the first encoded data from the accessor processor. For example, as previously described in connection with FIGS. 1 and 2, accessor processor 228 transmits, and browser extension 126 receives, a decoded version of the first encoded data, as shown by the arrow extending from accessor processor 228 to browser extension 126 in FIG. 2.

Flowchart 350 advances to block 334, which includes pointing the browser engine to one or more local storage locations of the decoded version of the first encoded data. For example, as previously described in connection with FIGS. 1 and 2, browser extension 126 points browser engine 122 to one or more local storage locations of the decoded version of the first encoded data, thereby facilitating the browser engine to subsequently render or otherwise process or manipulate a decoded version of the first encoded data.

Figure 3C:
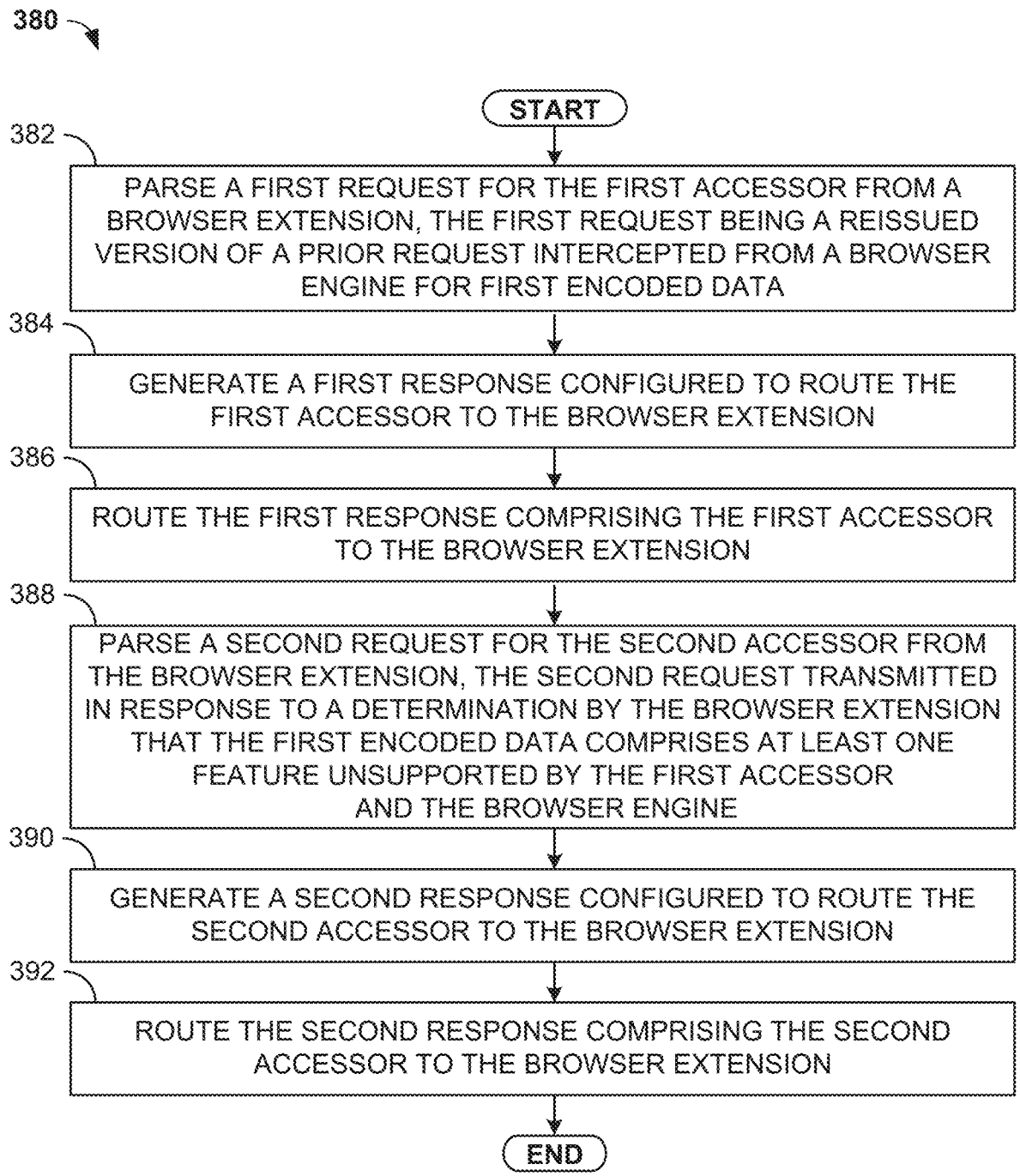
FIG. 3C illustrates yet another flowchart of a method of flexibly decoding and rendering a variety of multi-media data, in accordance with some embodiments.

FIG. 3C illustrates another flowchart 380 of a method of flexibly decoding and rendering a variety of digital data, in accordance with some embodiments. Flowchart 380 may correspond to operations of platform-independent accessor server 130 for at least some of the first through fourth implementations described above.

Flowchart 380 begins at the START block and proceeds to block 382, which includes parsing a first request for the first accessor from a browser extension, the first request being a reissued version of a prior request intercepted from a browser engine for the first encoded data. For example, as previously described in connection with FIGS. 1 and 2, browser decoder server 130 may comprise a request parser 232, which may comprise a general-purpose or special-purpose processor configured to receive and parse request 274.

Flowchart 380 proceeds to block 384, which includes generating a first response configured to route the first accessor to the browser extension. For example, as previously described in connection with FIGS. 1 and 2, the request parser processor of request processor 232 may generate response 275 including the first accessor stored in accessor database 234.

Flowchart 380 proceeds to block 386, which includes routing the first response comprising the first accessor to the browser extension. For example, as previously described in connection with FIGS. 1 and 2, accessor server 130 may transmit, and browser extension 126 may intercept, response 275 including the first accessor. In some embodiments, the first accessor may be transmitted in response 275 embedded within a BVR container.

Flowchart 380 proceeds to block 388, which includes parsing a second request for a second accessor from the browser extension, the second request transmitted in response to a determination by the browser extension that the first encoded data comprises at least one feature unsupported by the first accessor and the browser engine. For example, as previously described in connection with FIGS. 1 and 2, browser extension 126 may determine whether the first encoded data comprises at least one feature unsupported by the first accessor. In some embodiments, this determination may be carried out in either condition where the first encoded data is embedded in a BVR container or where the first encoded data is not embedded in a BVR container. Browser extension 126 may generate and transmit request 291 to accessor server 130. Accordingly, request parser 232 may parse request 291 for the second accessor from browser extension 126.

Flowchart 380 proceeds to block 390, which includes generating a second response configured to route the second accessor to the browser extension. For example, as previously described in connection with FIGS. 1 and 2, request parser 232 may generate response 292, which includes the second accessor therein.

Flowchart 380 proceeds to block 392, which includes routing the second response comprising the second accessor to the browser extension. For example, as previously described in connection with FIGS. 1 and 2, accessor server 130 may transmit, and browser extension 126 may intercept, response 292 including the second accessor. In some embodiments, the second accessor may be transmitted in response 292 embedded within a BVR container.

Although shown as a single flowchart, accessor server need not carry out blocks 382, 384 and 386 in order to carry out blocks 388, 390 and 392, and vice versa. For example, in implementations where response 273 from first content server 140 comprises a BVR file having embedded therein both the first encoded data and the first accessor, platform independent accessor server 130 need not transmit first accessor in response 275. Similarly, where first accessor is alternatively received from local accessor cache 229 in response 277, platform independent accessor server 130 need not transmit the first accessor in response 275. Likewise, even where blocks 382, 384 and 386 are carried out, a second accessor may not be needed to decode first encoded data, in which case, blocks 388, 390 and 392 need not be carried out. Similarly, where second accessor is needed or desired and is alternatively received from local accessor cache 229 in a response similar to response 277, platform-independent accessor server 130 need not transmit the second accessor in response 292.

Several examples of BVR containers (e.g, ISO-BMFF containers), as referred to in this specification, are described in more detail in connection with FIGS. 4-11 below.

Figure 4:
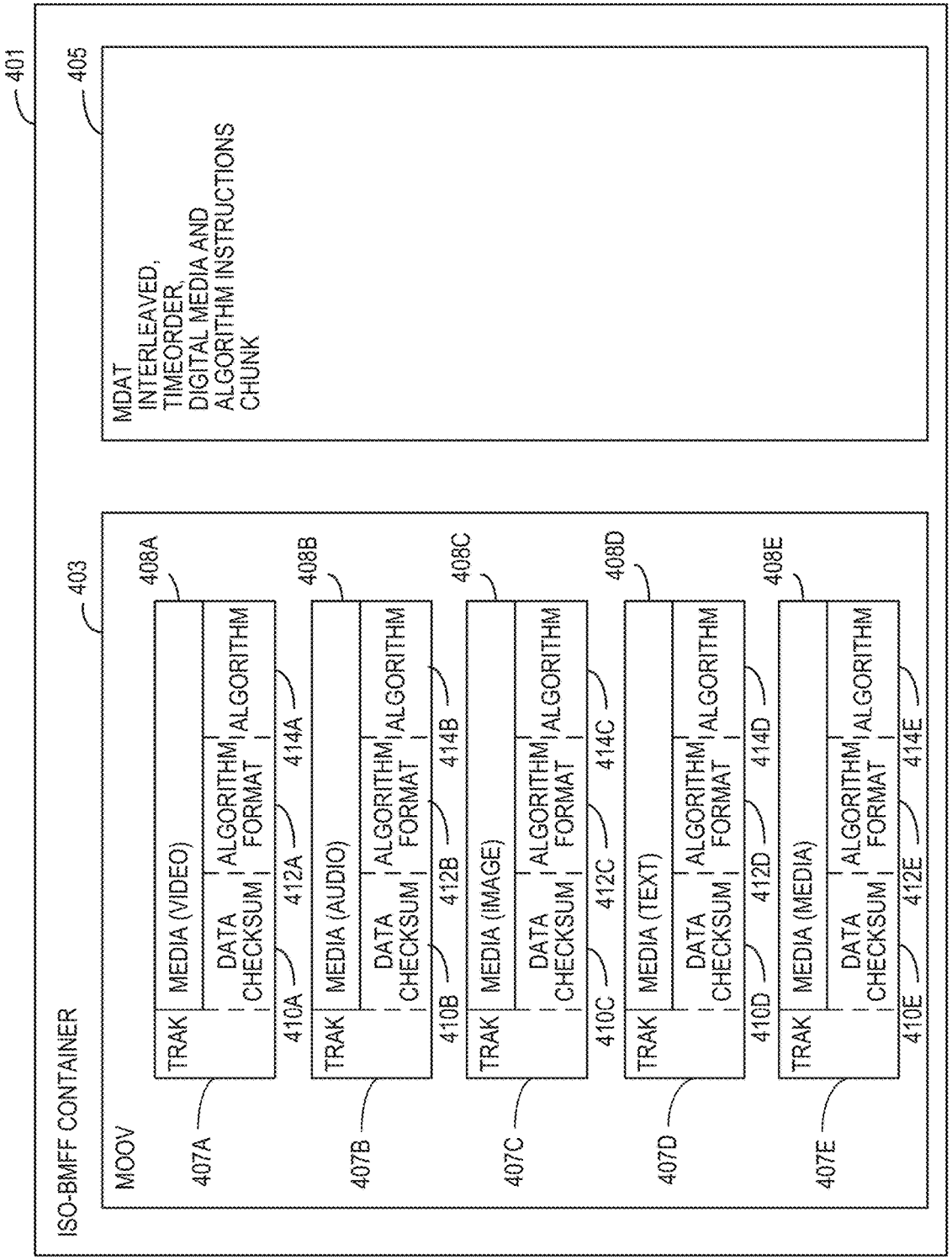
FIG. 4 shows an example of an ISO-BMFF format container (e.g., a BVR container), according to some embodiments.

FIG. 4 is a high-level illustration of a proposed ISO-BMFF container 401. The general concepts illustrated by FIG. 4 may be selectively applied in any of the example container formats shown below in FIGS. 5-10. The boxes in FIG. 4 show that additional non-traditional track "trak" boxes may be added to the container 401 to support digital data types such as, but not limited to, text, rich text documents, presentations, and scientific data. This extends the ISO-BMFF format by providing for the embedding of multiple types of digital data in a container. That is, a container may consist of one or more of the illustrated track boxes.

The container 401 includes a movie ("moov") box 403 and a media data ("mdat") box 405. Generally, the ISO-BMFF specification defines a moov box as a container box whose sub-boxes define metadata for a presentation. The mdat box 405 is defined by the ISO-BMFF specification as a box that can hold actual media data for a presentation. The illustrated aspect of FIG. 4 includes a moov box 403 that includes five trak boxes 407a-e. The number of trak boxes within the moov box may vary in other embodiments. Each track box includes an mdia box 408a-e. The ISO-BMFF standard traditionally defines a trak box to include a sequence of related samples for media data. Each mdia box 408a-e is defined by the ISO-BMFF specification to contain media information for a track. Some of the methods and systems disclosed herein propose to add additional data to each of the track boxes 407a-e. In some aspects, the proposed additional data may be included in only a subset of trak boxes included in the moov box 403.

The new data included in each of the trak boxes 407a-e includes checksum fields 410a-e, algorithm format fields 412a-e, and algorithm data indicator fields 414a-e. The checksum fields 410a-e may store hashes or checksums for algorithm defining data stored in the respective algorithm fields 414a-e. In some aspects, the hash or checksum fields 410a-e may indicate checksum values for both the algorithm data indicated by the respective algorithm field and also for content/presentation data for the associated trak, where the content and accessor algorithm are stored in the mdat box 405.

The algorithm format fields 412a-e may indicate a minimum version of an algorithm execution engine, such as a java virtual machine for Java based algorithms, common language runtime for C #algorithms, or other run-time interpreter, that is necessary to execute the algorithm indicated in the algorithm fields 414a-e. In some aspects, the algorithm format fields 412a-e may also indicate other dependencies associated with algorithms stored in the algorithm fields 414a-e. For example, input or output formats (such as RGB, YUV, etc), input/output functions of the algorithms stored in algorithm fields 414a-e, and/or data indicating possible optimizations and/or alternative functionality of the algorithms indicated in algorithm fields 414a-e may also be specified in the algorithm format fields 412a-e. For example, an accessor may define several methods for functions. Some of those functions may include platform specific functionality for decoding. In some aspects, the algorithm format fields 412a-e may store details of the data format being accessed.

In some aspects, the algorithm fields 414a-e indicate data implementing an algorithm. In some other aspects, the algorithm fields 414a-e identify a portion of the mdat box 405 that stores data implementing the algorithm. For example, the algorithm fields 414a-e may indicate a starting location of data implementing an algorithm based on an offset from the beginning of the container 401. A length of respective algorithm implementing data stored in the mdat box 405 may also be indicated by the algorithm fields 414a-e.

Note that in some aspects, existing ISO-BMFF boxes, such as the xml box or the udat box, may contain or point to header, provider-supplied metadata, and accessor information. This option may override other required information in the container. This may not promote reusability of information between track boxes. Each track box may contain header information such as one or more checksums, e.g., MD5 or SHA, versioning information, and the index to the intermediate-format accessor algorithms.

Figure 5:
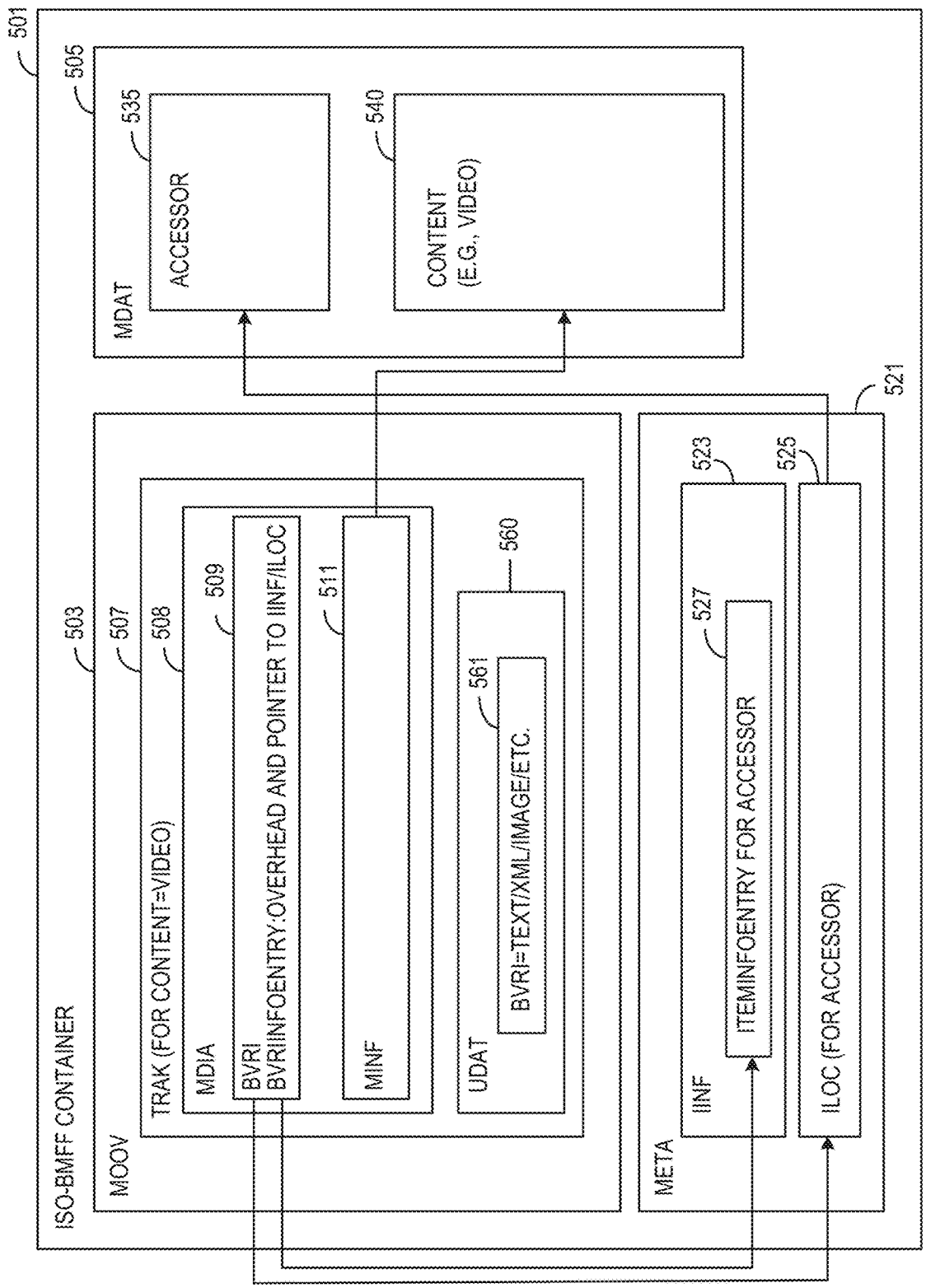
FIG. 5 shows an example of an ISO-BMFF container (e.g., a BVR container) that includes one or more accessors for data contained within the ISO-BMFF container, according to some embodiments.

FIG. 5 shows an example implementation of an ISO-BMFF container. The container 501 includes one or more accessors for data contained within the container. As illustrated in the high level overview provided by FIG. 4, the ISO-BMFF container 501 includes a movie (moov) box 503 and a media data (mdat) box 505. The moov box 503 includes at least one trak box 507. The trak box 507 includes a mdia box 508. The mdia box includes a new box, provisionally called a Bevara Resource Indication box or "bvri" box 509. The bvri box 509 may be assigned any unique box identifier not already assigned to a known box type. The bvri box 509 includes an info entry that identifies an iteminfoentry 527 within an iinf box 523. The bvri box 509 also identifies (via the info entry) an iloc box 525 within a meta box 521 (discussed below).

The mdia box 508 also includes a media information container or minf box 511. The minf box includes information identifying a location of content 540 in the mdat box 505. For example, the minf box 511 may indicate an offset from the beginning of the container 501 where the content 540 begins, and a length of the content in the mdat box 505. The content 540 may include any type of content. For example, the content 540 may comprise audio and/or video data. In some aspects, the content 540 may include other types of content not traditionally included in an ISO-BMFF container, such as word processing data encoding a document (such as .doc, .docx, .pdf, .rtf files). In some aspects, the content 540 may encapsulate or include other container formats. For example, content 540 may define an ogg container, avi container, f4v or FLV (Flash® video), DivX® media format, any of the Microsoft® Office® document formats, etc.

The container 501 also includes a meta box 521. The meta box 521 includes the iinf box 523 and the iloc box 525. The iinf box 523 includes the item info entry 527. The item info entry 527 includes information about an accessor 535 for the content 540. For example, the item info entry 527 may include a hash of the content 540, such as a checksum, or other information about content 540.

In some aspects, the content 540 may include uncontained data. In these aspects, the accessor 535 may implement a decoder/interpreter for the uncontained data. For example, if content 540 contains document data, accessor 535 may implement a word processor for the document data. If the content 540 is video data, the accessor 535 may implement a video decoder for the video data.

As discussed above, in some other aspects, the content 540 may include data formatted in one or more container formats. In these aspects, the accessor 535 may implement an algorithm that can both extract data from the container format, and then also access or decode the data encapsulated or "contained" by that container. For example, if the content 540 contains ogg container data that encapsulates avi data, the accessor 535 may implement both an ogg extractor and an avi decoding algorithm.

Figure 9:
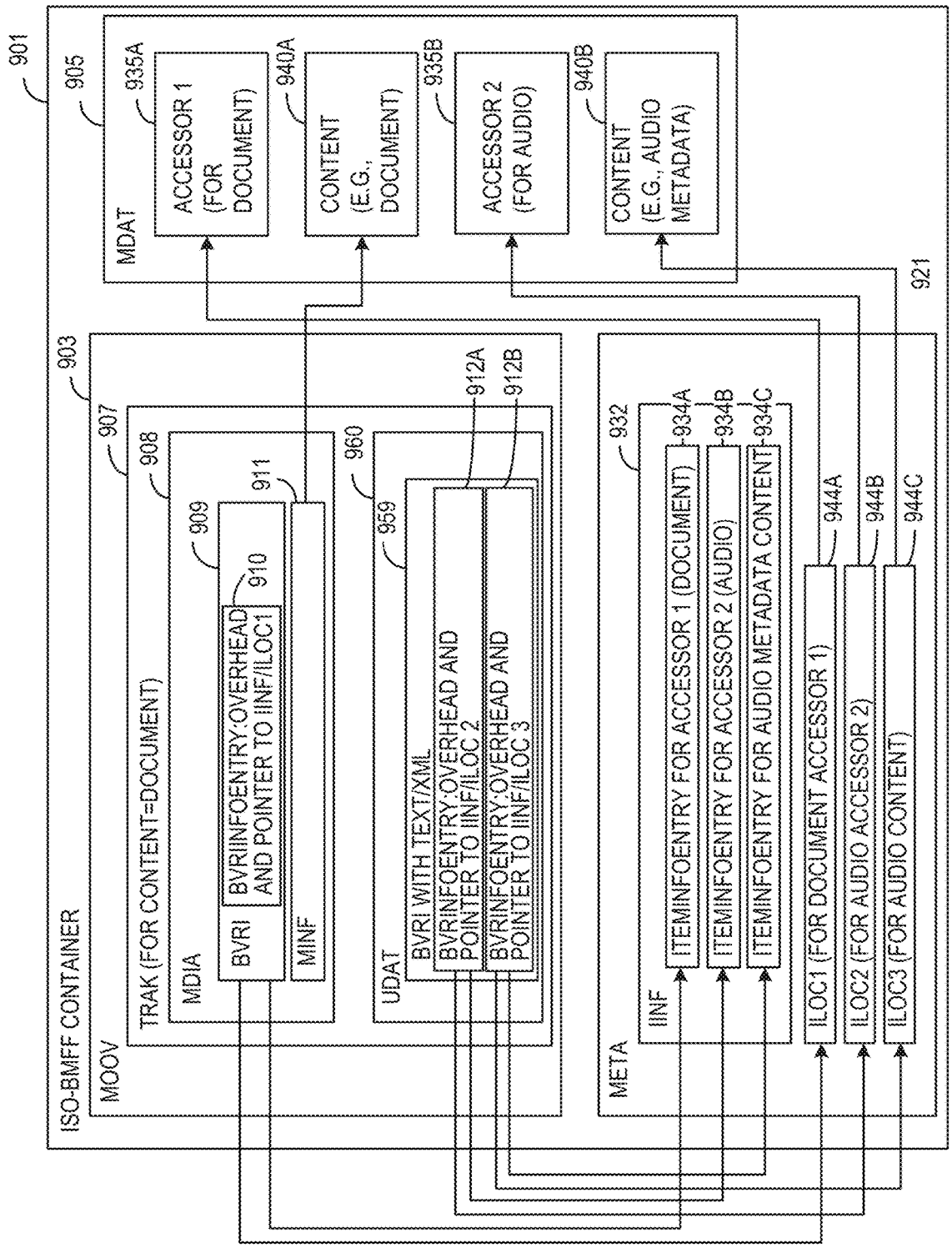
FIG. 9 shows another example of an ISO-BMFF container (e.g., a BVR container) format, according to some embodiments.

The udat box 560 illustrates that some aspects of an enhanced container may include metadata 561 associated with content identified by the minf box 511 in the media box 508 (or in the case of content 640 below, content identified indirectly by box 610a, via an index and the actual location information in box 644b). In some aspects, the metadata 561 may be supplied by a user. The metadata 561 may be in the form of text, XML, or other typed data. Alternatively, or in addition, as shown in FIGS. 9 and 10 below, metadata may itself have associated accessors.

The disclosed methods and systems may encode typed metadata (and XML which is really formatted text) by either including it in a udat bvri box, such as udat bvri box 561, or by pointing to it when the metadata is contained in the mdat box 505. When content or meta-data has an associated accessor, an additional bvriInfoEntry may be provided in the udat box as illustrated in FIG. 10 below The format disclosed in FIG. 5 embeds a platform independent accessor in a container and also embeds the content to be accessed. The format may optionally embed metadata related to the content. If the content is multimedia content such as video, a traditional video player able to interpret MP4 containers may then parse the extended ISO-BMFF container shown in FIG. 5, and may ignore boxes 509, 527, 525, 535, and 561. This traditional video player will use its own built-in video decoder to decode the content in box 540. Thus, the format shown in FIG. 5 is backwards compatible to existing players when the content in box 540 conforms with the ISO-BMFF specification at the time of filing the present application (for example, audio content, image content, video content).

Figure 6:
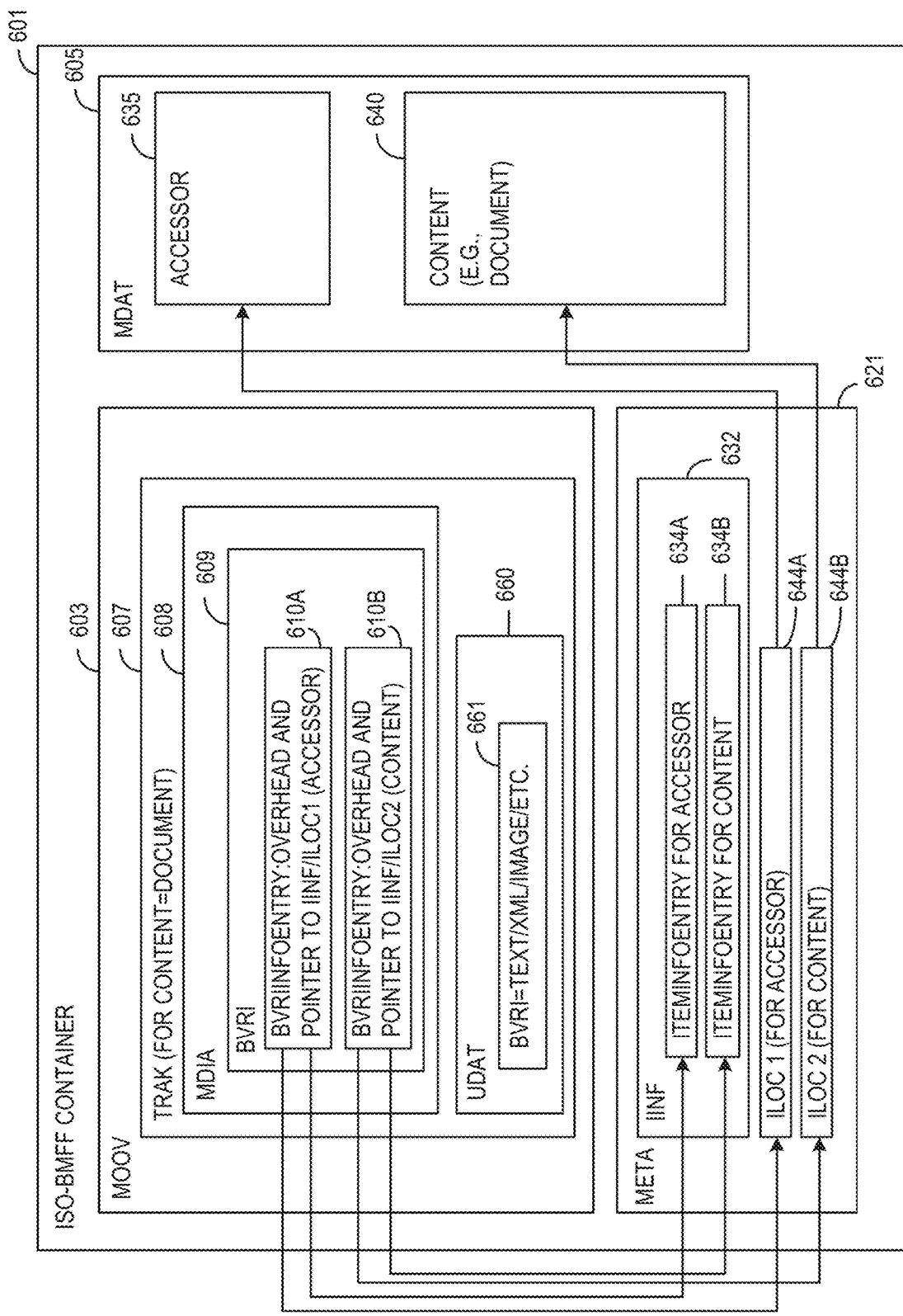
FIG. 6 shows another example of an ISO-BMFF container (e.g., a BVR container) format, according to some embodiments.

FIG. 6 shows another example of a proposed ISO-BMFF container format 601. Similar to FIGS. 4 and 5, the ISO-BMFF container 601 includes a movie (moov) box 603 and a media data (mdat) box 605. The moov box 603 includes at least one trak box 607. The trak box 607 includes an mdia box 608. The mdia box includes a new "bvri" box 609, similar to bvri box 509 discussed above. The bvri box 609 may be assigned any unique box identifier not already assigned to a known box type.

The bvri box 609 includes two bvri info entries 610a and 610b. In some aspects, the two bvri info entries 610a-b may be an array of bvriInfoEntry boxes or an array of info inside one bvriInfoEntry. The first bvri info entry 610a identifies an item info entry 634a. The item info entry 634a is located within an iinf box 632. The iinf box 632 is located within a meta box 621. The item info entry 634a includes information relating to accessor data 635. For example, the item info entry 634a may include checksum information for the accessor data 635. In some aspects, the item info entry 634a may include version information for the accessor data 635. For example, the version information may indicate a minimum version of an accessor execution engine that can be used to invoke an algorithm implemented by the accessor data 635. Accessor data 635 implements one or more algorithms for accessing content 640.

The first bvri info entry 610a also identifies a iloc box 644a within the meta box 621. The iloc box 644a includes information identifying accessor data 635 within the mdat box 605. For example, the iloc box 644a may indicate a starting offset for accessor data 635 relative to the beginning of the container 601. This starting offset may fall within the mdat box 605. The iloc box 644a may also indicate a length of the accessor data 635 within the mdat box 605.

The second bvri info entry 610b identifies an item info entry 634b stored within the iinf box 632. The item info entry 634b includes information relating to content 640. The second bvri info entry 610b also identifies a second iloc box 644b. The second iloc box 644b identifies content 640 within mdat box 605. Similar to content 540 discussed with respect to FIG. 5, content 640 may contain media data, for example, video, audio, data encoding a document, data encoding a container, or other form of digital data.

Accessor 635 relates to or is associated with content 640 because it is referenced by the same trak 607 as content 640. A decoder of the container 601 may invoke accessor 635 on content 640 based on the accessor 635 and the content 640 being indicated by the same trak 607. In the disclosed embodiments, a container may be structured to relate one accessor with multiple content(s) by referencing the one accessor from multiple tracks (trak boxes).

The trak box 607 also includes a udat box 660, and a brvi entry 661. In the illustrated embodiment, the bvri entry 661 indicates metadata relating to the content stored in content box 640 and associated with the trak box 607. In the example of udat box 660, a type of the metadata 661 may be text, xml, image, or any type.

Similar to the container 501 of FIG. 5, the container format 601 disclosed in FIG. 6 also embeds a platform-independent accessor in a container with the content to be accessed. The container may also optionally embed metadata pertaining to content 640. Whereas FIG. 5 utilizes the minf box 511 to identify content 540, note that the embodiment of FIG. 6 utilized the iloc box 644b to identify content 640; see boxes 660 and 661 corresponding to boxes 560 and 561 of FIG. 5. Utilization of the minf box provides for fragmenting of content into samples or access units using stbl boxes as described by the ISO-BMFF specification. Each sample may have associated metadata (timing and content information).

Figure 7:
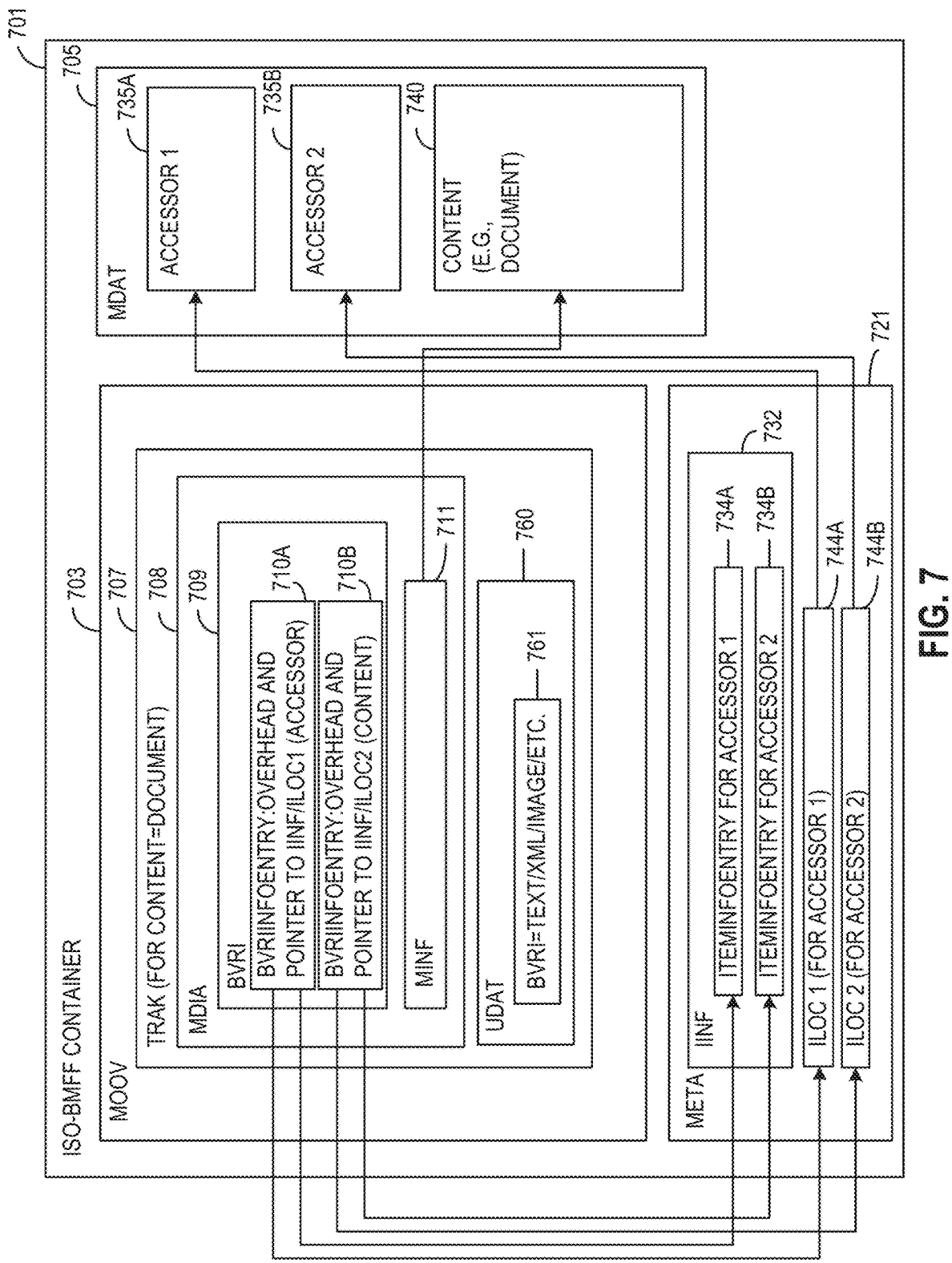
FIG. 7 shows another example of an ISO-BMFF container (e.g., a BVR container) format, according to some embodiments.

FIG. 7 shows another example of a proposed ISO-BMFF container format 701. Similar to FIGS. 4-6, the ISO-BMFF container 701 includes a movie (moov) box 703 and a media data (mdat) box 705. The moov box 703 includes at least one trak box 707. While the trak box 707 is shown as including document type content, it should be understood that the format of the container provided in FIG. 7 can support any content data type. The trak box 707 includes a mdia box 708. The mdia box includes a new "bvri" box 709, similar to bvri boxes 509, and/or 609 discussed above. The bvri box 709 may be assigned any unique box identifier not already assigned to a known box type. The bvri box 709 may include a first bvri info entry 710a that identifies an item info entry 734a within an iinf box 732 and an iloc box 744a, discussed below. The bvri box 709 may also include a second bvri info entry 710b that identifies a second item info entry 734b within the iinf box 732 and a second iloc box 744b.

The mdia box 708 also includes a media information container or minf box 711. The minf box 711 includes information identifying a location of content 740 in the mdat box 705. For example, the minf box 711 may indicate a starting position of the content 740 based on an offset from the beginning of the container 701. The minf box 711 may also indicate a length of the content 740 in the mdat box 705. The content 740 identified by the minf box 711 may be content corresponding to the track identified by the trak box 707. To retain compatibility with decoders that can access mp4 video, the embodiment of FIG. 7 utilizes standard video container structures. For example, in some aspects, content 740 may be video content, and is identified via the minf box 711. In some other aspects, content 740 may be document content, audio content, a container, image content, or virtually any other digital typed data.

The ISO-BMFF container 701 also includes a meta box 721. The meta box 721 includes the iinf box 732 and the iloc boxes 744a and 744b. The iinf box 732 includes an item info entry 734a. The item info entry 734a includes information relating to accessor 735a (optionally including version and/or hash/checksum information as discussed above). The iinf box 732 also includes a second item info entry 734b that includes information relating to accessor 735b.

The meta box 721 also includes an iloc box 744a. The iloc box 744a identifies data in the mdat box 705 implementing an accessor 735a for content 740. For example, the iloc box 744a may identify accessor 735a via an offset from the beginning of the container 701 and length within the mdat box 705. The meta box 721 also includes an iloc box 744b. The iloc box 744b identifies data in the mdat box 705 defining an accessor 735b for content 740. The embodiment of FIG. 7 shows that more than one accessor may be defined for the same content (content 740) when using various aspects of the proposed ISO-BMFF container formats.

The format disclosed in FIG. 7 permits more than one platform-independent accessor to be packaged with their associated content. The accessors 735a-b are related to the content 740 through the bvri box 709 within the trak 707. This structure provides a concise and consistent packaging of the content 740 and the accessors 735a-b. To process the container format illustrated in FIG. 7, a decoding device (for example, browser engine 122, browser extension 126 or decoder processor 228) determines by reading the trak 707 and identifying at least two bvrInfoEntries 710a-b and associated content 740, that more than one accessor is packaged with the trak 707. In some aspects, the decoder may provide a user with an option of which one of the accessors should be executed on the associated content/data. In other aspects, both accessors 735a-b may be invoked automatically on the content 740. The container may also optionally contain embedded metadata pertaining to content 740; see boxes 760 and 761 corresponding to boxes 560 and 561 of FIG. 5.

Figure 8:
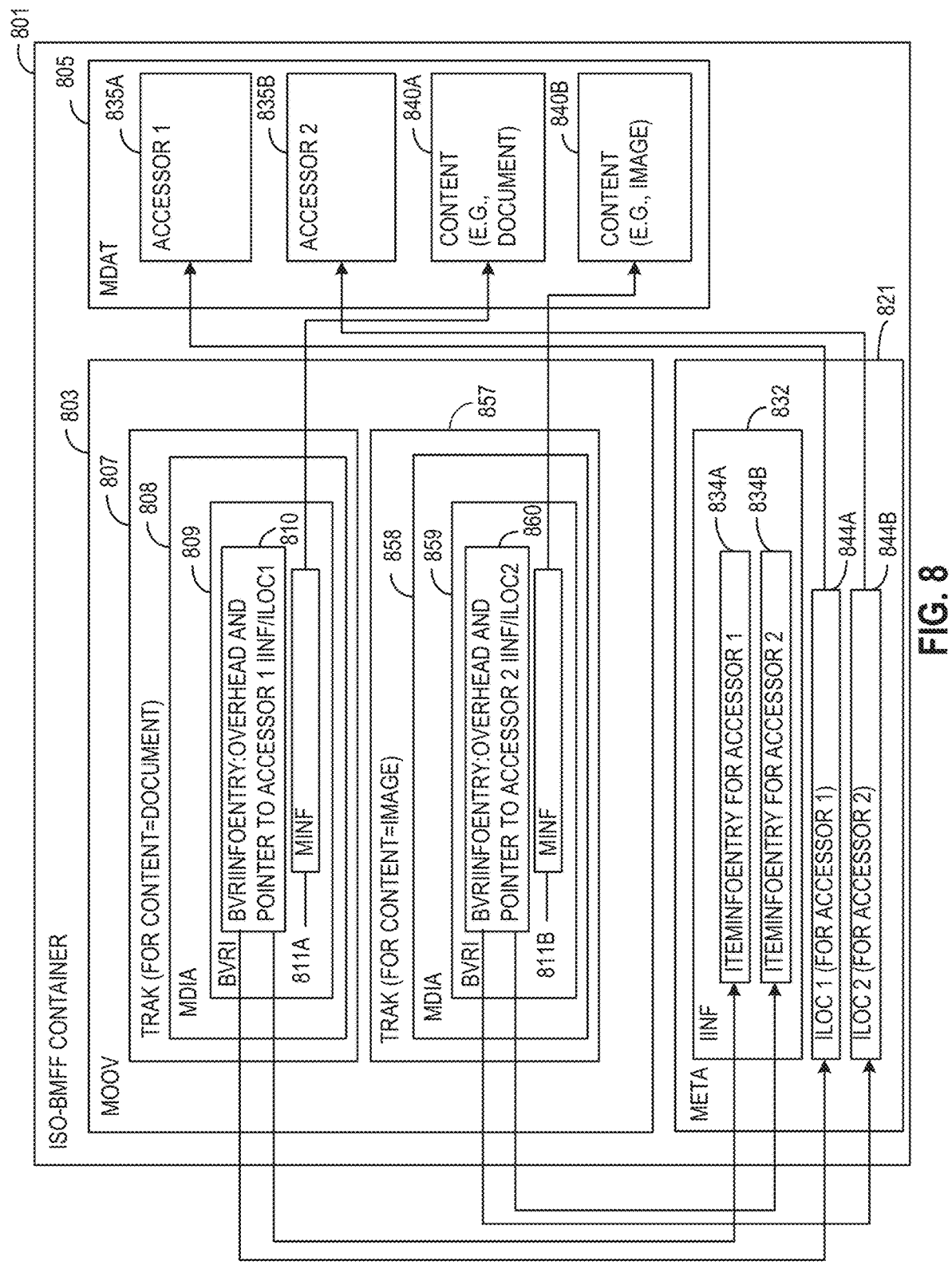
FIG. 8 shows another example of an ISO-BMFF container (e.g., a BVR container) format, according to some embodiments.

FIG. 8 shows another example of a proposed ISO-BMFF container format 801. Similar to FIGS. 4-7, the ISO-BMFF container 801 includes a movie (moov) box 803 and a media data (mdat) box 805. The moov box 803 includes at least one trak box 807. The trak box 807 includes a mdia box 808. The mdia box includes a new "bvri" box 809, similar to bvri boxes 509, 609, and/or 709 discussed above. The bvri box 809 may be assigned any unique box identifier not already assigned to a known box type. The bvri box 809 may include a bvri info entry 810 that identifies an item info entry 834a within iinf box 832 and an iloc box 844a, discussed below.

The mdia box 808 also includes a media information container or minf box 811a. The minf box 811 a includes information that identifies content 840a. For example, the minf box 811 a may indicate a starting position of content 840a based on an offset from the beginning of the container 801. The minf box 811 a may also indicate a length of the content 840a.

The moov box 803 also includes a second trak box 857. The trak box 857 includes a second mdia box 858. The second mdia box 858 includes a new "bvri" box 859. The bvri box 859 may also be assigned any unique box identifier not already assigned to a known box type. The bvri box 859 has the same box identifier as bvri box 809. The bvri box 859 may include a bvri info entry 860 that identifies an item info entry 834b within the iinf box 832. The bvri info entry 860 within the bvri box 859 may also identify an iloc box 844b. The second bvri box 859 also includes a second minf box 811 b.

The ISO-BMFF container 801 also includes a meta box 821. The meta box 821 includes the iinf box 832. The iinf box 832 includes the item info entry 834a and a second item info entry 834b. The item info entry 834a may include information relating to accessor 835a (such as hash and/or version information as discussed previously). The second item info entry 834b includes information relating to accessor 835b.

The meta box 821 also includes the iloc box 844a. The iloc box 844a identifies data in the mdat box 805 defining an accessor 835a for content 840a. For example, the iloc box 844a may identify an offset from the beginning of the container 801 and length within the mdat box 805. The meta box 821 also includes an iloc box 844b. The iloc box 844b identifies data in the mdat box 805 implementing an accessor 835b for content 840b. The embodiment of FIG. 8 shows that a single ISO-BMFF container may define multiple tracks, with each track identifying its own content and at least one accessor for that content. The accessor(s) 835a and 835b are specific to each track 807 and 857 respectively in FIG. 8. Note that while FIG. 8 does not show metadata associated with either content 840a or 840b, some aspects of the container 801 may also associate metadata with one or both of contents 840a-b. For example, the metadata structures shown in FIG. 9 and/or FIG. 10 may also be used with the container 801 in some aspects.

The format disclosed in FIG. 8 permits the packaging of more than one content (e.g. 840a-b) while also packaging platform-independent accessors 835a-b for each content 840a-b. Each accessor is related to its associated content through a bvri box within the trak. This provides a concise and consistent packaging of the multiple contents and their associated accessors.

To process the ISO-BMFF format illustrated in FIG. 8, an ISO-BMFF decoder 262 may read the moov box 803 and recognize that more than one trak, e.g. 807 and 857, are present. This indicates that more than one content is available and that more than one accessor is packaged. The decoding device, depending on configuration, may then either invoke both accessors so that they operate on their respective content. In some aspects, the decoding device may provide a user with an option to select which one of the accessors to invoke and use on its associated content/data.

In some aspects, the format of FIG. 8 may encode embedded video (embedded content) in a powerpoint presentation (wrapper content) or embedded data graphics (embedded content) in a scientific document (wrapper content). One aspect of a decoder of the format of FIG. 8 may enable a user to view/playback the presentation or document (wrapper content) via a corresponding second accessor until the embedding location is reached. When the playback reaches the location of the embedded content, the decoder may invoke a corresponding first accessor which operates on the embedded content. In some aspects, a pointer from the first content back to the secondary content trak in the ISO-BMFF container is provided (not shown). In some aspects, a pointer from the first track to the second trak may be provided, which provides an indication of where the embedded content and accessor for the embedded content is located.

FIG. 9 shows another example of a proposed ISO-BMFF container format 901. Similar to FIGS. 4-8, the ISO-BMFF container 901 includes a movie (moov) box 903 and a media data (mdat) box 905. The moov box 903 includes at least one trak box 907. The trak box 907 includes a mdia box 908. The mdia box 908 includes a new "bvri" box 909, similar to bvri boxes 509, 609, 709, and/or 809 discussed above. The bvri box 909 may be assigned any unique box identifier not already assigned to a known box type. The bvri box 909 may include a bvri info entry 910 that identifies an item info entry 934a within iinf box 932 and an iloc box 944a, discussed below.

The mdia box 908 also includes a media information container or minf box 911. The minf box includes information that identifies content 940a. In some aspects, content 940a may define a document, such as a word processing document (.doc, .txt, .rtf, etc), but may alternatively include any other type of content.

The trak box 907 also includes a user data or udat box 960. The udat box 960 includes a metadata bvri box 959 including two bvri info entries 912a and 912b. The bvri info entry 912a identifies an item info entry 934b within iinf box 932 and an iloc box 944b. The bvri info entry 912b identifies an item info entry 934c within iinf box 932 and an iloc box 944c.

The ISO-BMFF container 901 also includes a meta box 921. The meta box 921 includes the iinf box 932. The iinf box 932 includes an item info entry 934a, a second item info entry 934b, and a third item info entry 934c. The item info entry 934a includes information relating to accessor 935a. The iinf box 932 also includes a second item info entry 934b that includes information relating to accessor 935b. The iinf box 932 also includes a third item info entry 934c that includes information relating to metadata content 940b.

The meta box 921 also includes three iloc boxes 944a-c. The iloc box 944a identifies data in the mdat box 905 defining an accessor 935a for content 940a. For example, the iloc box 944a may identify an offset from the beginning of the container 901 identifying a starting position of accessor 935a, and a length within the mdat box 905 of accessor 935a. The meta box 921 also includes a iloc box 944b. The iloc box 944b identifies data in the mdat box 905 defining an accessor 935b for content 940b. The iloc box 944c identifies data in the mdat box 905 defining metadata content 940b, which may be audio metadata in some aspects, but may alternatively include any other type of content.

The embodiment of FIG. 9 shows that complex metadata (identified by the udat box 960) may include multiple formats of metadata for one content. Metadata may not be limited to text or xml data. For example, audio or graphics data may be used to annotate content. For example, content 940b may annotate content 940a in the example of FIG. 9. Because the metadata identified in the udat box 960 is within the trak box 907, the metadata is associated with content associated with track box 907 (i.e. content 940a via minf box 911).

The format disclosed in FIG. 9 provides for complex forms of metadata packaged and associated with particular content. This provides some degree of "future-proofing" of metadata, in a similar manner that the main content is future proofed, i.e., an expanded ISO-BMFF container contains information to interpret/decode both the packaged content and the packaged metadata When processing the proposed ISO-BMFF format illustrated in FIG. 9, a decoder 262 may reads the moov box 903 and recognize that the trak 907 "contains" (contains or points to) both content and metadata. By examining the udat metadata bvri box 959, the decoder can identify that some of the metadata is complex, that is, it also requires an accessor above and beyond the accessor required by the content 940a. The decoder, depending on configuration, may then either invokes both accessors such that they operate on their respective content simultaneously, or may provide a user with an option of displaying/playing the metadata in addition or, or instead of, the main content.

FIG. 10 shows another example of a proposed ISO-BMFF container format 1001. Similar to FIGS. 4-9, the ISO-BMFF container 1001 includes a movie (moov) box 1003 and a media data (mdat) box 1005. The moov box 1003 includes at least one trak box 1007a. The trak box 1007a includes an mdia box 1008a. The mdia box 1008a includes a new "bvri" box 1009a, similar to bvri boxes 509, 609, 709, 809, and/or 909 discussed above. The bvri box 1009a may be assigned any unique box identifier not already assigned to a known box type. The bvri box 1009a may include a bvri info entry that identifies an item info entry 1034a within iinf box 1032 and an iloc box 1044a, discussed below.

The mdia box 1008a also includes a media information container or minf box 1011a. The minf box 1011a includes information that identifies content 1040a. In some aspects, content 1040a may define a document, such as a word processing document. (.doc, .txt, .rtf, etc), or may define any other type of content, for example, spreadsheets, presentations, figures, video, image, and/or audio data.

The trak box 1007a also includes a user data or udat box 1060. The udat box 1060 includes a bvri box 1061 including a bvri info entry 1012. The bvri info entry 1012 identifies a second track box 1007b.

The second track box 1007b includes a second mdia box 1008b. The second mdia box 1008b includes a second bvri box 1009b. This second bvri box 1009b includes one or more item info entries 1010b that identify a second item info entry 1034b within iinf box 1032 and a second iloc box 1044b. The second mdia box 1008b also includes a second minf box 1011b which includes information identifying metadata content 1040b.

The ISO-BMFF container 1001 also includes a meta box 1021. The meta box 1021 includes the iinf box 1032. The iinf box 1032 includes an item info entry 1034a, and a second item info entry 1134b. The item info entry 1034a includes information relating to accessor 1035a (for example, versioning or hash information as discussed previously). The iinf box 1032 also includes a second item info entry 1034b that includes information relating to accessor 1035b.

The meta box 1021 also includes two iloc boxes 1044*a-b*. The iloc box 1044*a* identifies data in the mdat box 1005 defining an accessor 1035*a* for content 1040*a*. For example, the iloc box 1044*a* may identify an offset from a beginning of the container 1001 and length within the mdat box 1005 that includes data implementing an algorithm for accessing the content 1040*a*. The meta box 1021 also includes the iloc box 1044*b*. The iloc box 1044*b* identifies data in the mdat box 1005 defining an accessor 1035*b* for content 1040*b*. For example, the iloc box 1044*b* may identify a starting position for the accessor 1035*b* based on offset from a beginning of the container 1001. The iloc box 1044*b* may also indicate a length of accessor 1035*b*.

The embodiment of FIG. 10 shows that complex metadata may identify multiple formats of metadata for one content 1040*a*. Metadata may not be limited to text or xml data. In this example, metadata is shown to include an audio annotation (provided by accessor 1035*b* operating on content 1040*b*) in addition to or in place of text/XML metadata (provided by udat box 1060).

The advantages of the format disclosed in FIG. 10 are that complex forms of metadata can be packaged with the associated content. This provides some degree of future proofing of metadata in the same way that the main content is future proofed, i.e., that the expanded ISO-BMFF container holds all the information required to interpret/decode both the packaged content and the packaged metadata.

To process an ISO-BMFF format illustrated in FIG. 10, a decoder, such as browser engine 122, browser extension 126 or decoder processor 228) may read the moov box 1003 and determine that the trak 1007*a* "contains" (contains or points to) both content and metadata. By examining the udat metadata bvri box, the decoder may determine that some of the metadata is complex, that is, it also requires an accessor above and beyond the accessor required by the content 1040*a*. As opposed to the embodiment in FIG. 9, the trak structure 1007*a* identifies another trak as specific to metadata. This structure additionally provides for recursive metadata, e.g., the metadata can have its own metadata.

Furthermore, neither the embodiments of FIG. 9 or FIG. 10 are limited to a single non-text metadata. For instance, annotating audio and an author image may be included in the metadata. A decoding device, depending on configuration, may invoke both accessors such that they operate on their respective content, or can provide a user with the option of displaying/playing the metadata in addition or, or instead of, the main content.

Note that although distinct examples of container formats are provided in FIGS. 5-10, it should be understood that various features of each of FIGS. 5-10 may be combined with other features disclosed in other of FIGS. 5-10 where appropriate as one of skill in the art may judge. For example, the bvriInfoEntry 610*b* iinf/iloc indicator of content may be used in place of the minf indicators within boxes 708, 808, 858, 908, 1008*a*, and 1008*b*. As another example, text or XML metadata may be packaged with a text or XML accessor, respectively, in the manner indicated for audio and other non-text content in FIG. 9. Similarly, a bvriInfoEntry may provide information on the link between several tracks (for instance a document could be stored on several tracks). In addition, a bvriInfoEntry could be used to point to extra information in the mdat for one particular track.

FIG. 11 illustrates another example BVR container, but this time in the ZIP format. The ZIP format may be simpler than the ISO-BMFF format container described above, but all the same data and metadata described above can also be packaged in a ZIP format. The end of a ZIP file includes a Central Directory portion that includes a metadata block for each file in the ZIP file. These metadata blocks may include name, file start offset, and other information about each file. These blocks are denoted 1125*a* through 1125*d* in FIG. 11, corresponding to files 1120*a*, 1120*b*, 1130*a*, and 1130*b*. When used as a BVR container, the data files may comprise one or more encoded data files and one or more accessors similar to the ISO-BMFF format BVR containers. Each file 1120, 1130 is introduced by a file header 1105*a*, 1105*b*, 1105*c*, and 1105*d*. These headers may include file name and size. The ZIP format also allows the use of freely definable metadata fields in these headers, which may be used to store BVR container metadata such as set forth above with reference to the ISO-BMFF format containers.

General Interpretive Principles for the Present Disclosure

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A system for decoding data, the system comprising:
    browser code configured for execution on general-purpose processing circuitry;
    memory circuitry storing a plurality of accessors, wherein at least some of the plurality of accessors comprise platform-independent syntax implementing an algorithm for decoding encoded data;
    wherein the browser code is configured to access the memory circuitry automatically without user intervention and retrieve one or more of the plurality of accessors in response to retrieving encoded data.

2. The system of claim 1, wherein the browser code is configured to access at least a portion of the memory circuitry over a WAN or LAN.

3. The system of claim 1, wherein at least a portion of the memory circuitry forms an accessor cache local to the general-purpose processor.

4. The system of claim 1, wherein the browser code includes an accessor processor configured to decode retrieved encoded data using one or more of the accessors stored in the memory.

5. The system of claim 1, wherein the plurality of accessors includes accessors that differ by what file formats they decode.

6. The system of claim 5, wherein the plurality of accessors includes accessors that decode the same file formats but differ by their data manipulation capabilities.

7. A system for decoding data, the system comprising:
    browser code configured for execution on general-purpose processing circuitry;
    memory circuitry storing a database of accessor functionalities, wherein at least some of the accessor functionalities stored in the database comprise platform-independent syntax implementing different algorithms for decoding encoded data;
    wherein the browser code is configured to access the database automatically without user intervention and retrieve a plurality of the accessor functionalities in response to retrieving encoded data.

8. The system of claim 7, wherein the platform-independent syntax comprises WebAssembly syntax.

9. The system of claim 7, wherein the browser code comprises a browser engine and a browser extension.

10. The system of claim 7, wherein the encoded data comprises one or more media files.

11. The system of claim 7, wherein the browser code is configured to retrieve accessor functionalities from the database over a WAN or LAN.

12. The system of claim 7, wherein the browser code is configured to retrieve accessor functionalities from the database from memory local to the general-purpose processing circuitry.

13. The system of claim 7, wherein the browser code includes an accessor processor configured to decode retrieved encoded data using the plurality of accessor functionalities retrieved from the database.

14. The system of claim 7, wherein the database stores accessor functionalities that differ by what file formats they decode.

15. The system of claim 14, wherein the database stores accessor functionalities that decode the same file formats but differ by their data manipulation capabilities.

* * * * *